(12) United States Patent
Billard et al.

(10) Patent No.: US 11,724,908 B2
(45) Date of Patent: Aug. 15, 2023

(54) ELECTRONIC ACTUATION MODULE FOR ELEVATOR SAFETY BRAKE SYSTEM

(71) Applicant: Otis Elevator Company, Farmington, CT (US)

(72) Inventors: Justin Billard, Amston, CT (US); Antonio Martins, Vernon, CT (US); Juan Antonio Illan, Madrid (ES)

(73) Assignee: OTIS ELEVATOR COMPANY, Farmington, CT (US)

(*) Notice: Subject to any disclaimer, the term of this patent is extended or adjusted under 35 U.S.C. 154(b) by 443 days.

(21) Appl. No.: 16/910,211

(22) Filed: Jun. 24, 2020

(65) Prior Publication Data
US 2021/0403278 A1 Dec. 30, 2021

(51) Int. Cl.
*B66B 1/32* (2006.01)
*B66B 5/22* (2006.01)
*H01F 7/02* (2006.01)
*H02K 7/102* (2006.01)

(52) U.S. Cl.
CPC .............. *B66B 1/32* (2013.01); *B66B 5/22* (2013.01); *H01F 7/0221* (2013.01); *H02K 7/1023* (2013.01)

(58) Field of Classification Search
CPC ............ B66B 1/32; B66B 5/22; B66B 5/18
See application file for complete search history.

(56) References Cited

U.S. PATENT DOCUMENTS

| 2015/0259175 A1* | 9/2015 | West ............... F16D 63/008 |
| | | 187/359 |
| 2016/0236904 A1 | 8/2016 | Witczak et al. |
| 2017/0107078 A1* | 4/2017 | Hu .................. B66B 5/04 |
| 2018/0222718 A1* | 8/2018 | Khzouz ............ B66B 5/18 |

FOREIGN PATENT DOCUMENTS

| EP | 3587328 A2 | 1/2020 | |
| WO | WO-2017087978 A1 * | 5/2017 | ........... B66B 5/04 |

OTHER PUBLICATIONS

European Search Report Issued in European Application No. 20215721.9-1017 dated Jun. 1, 2021; 8 Pages.

* cited by examiner

*Primary Examiner* — Diem M Tran
(74) *Attorney, Agent, or Firm* — Cantor Colburn LLP

(57) ABSTRACT

An electronic actuator for an elevator safety brake system, the actuator having: an electromagnet assembly; and a first magnet assembly configured for being retracted from engagement with a rail depending on an energized state of the electromagnet assembly, the first magnet assembly including: blocks spaced apart from each other, respectively defining block bodies, and elongated block legs respectively extending aft from the block bodies; and a first magnet is disposed between the block bodies; wherein the electromagnet assembly includes: a core that defines: a core body extending between core ends that are spaced apart from each other; and core stub legs respectively extending forward from the core ends that are positioned adjacent to the elongated block legs when the first magnet assembly is retracted; and a coil winding wound about bobbins that are placed over the core body, the elongated block legs are longer than the core stub legs.

8 Claims, 18 Drawing Sheets

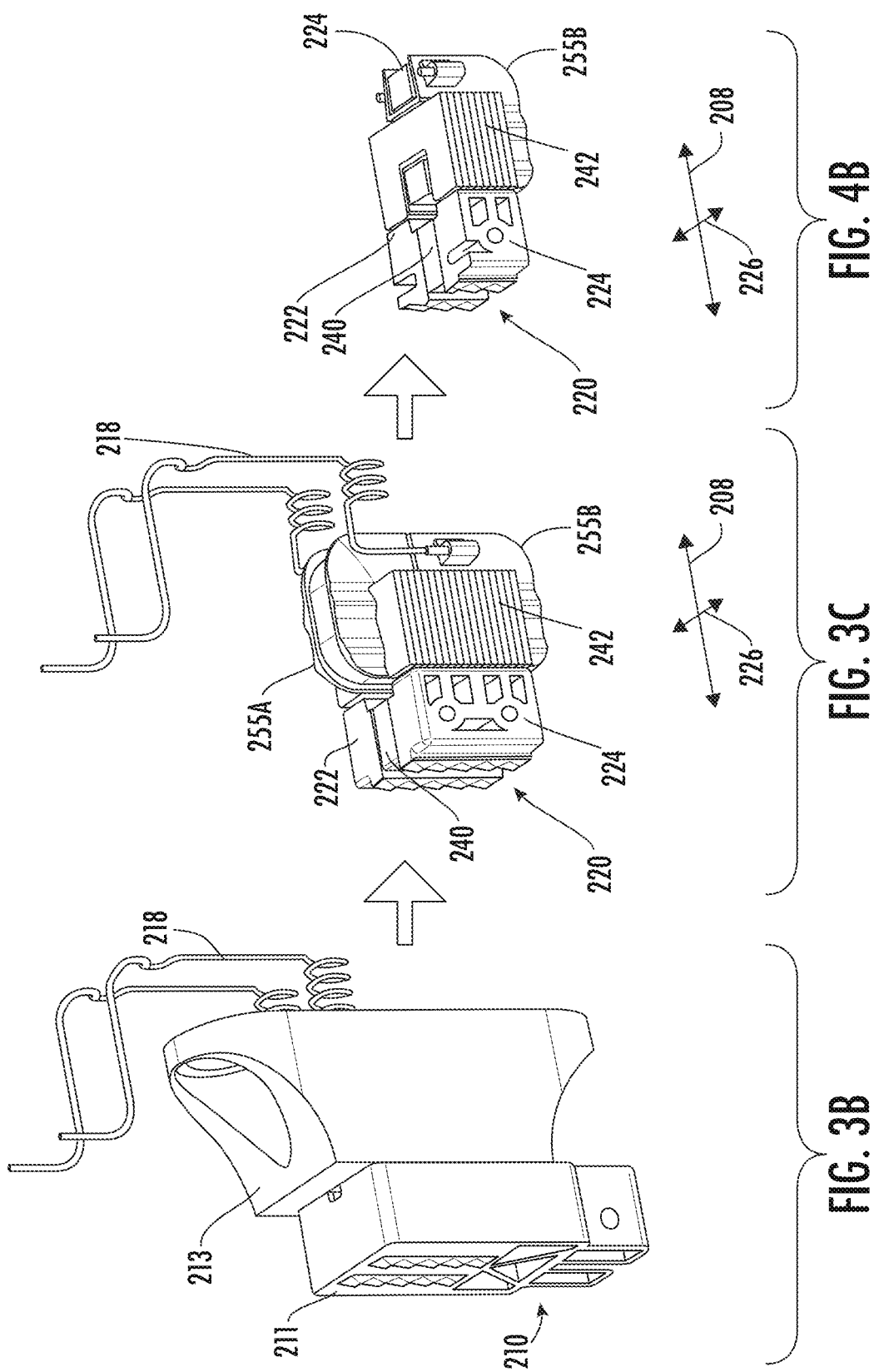

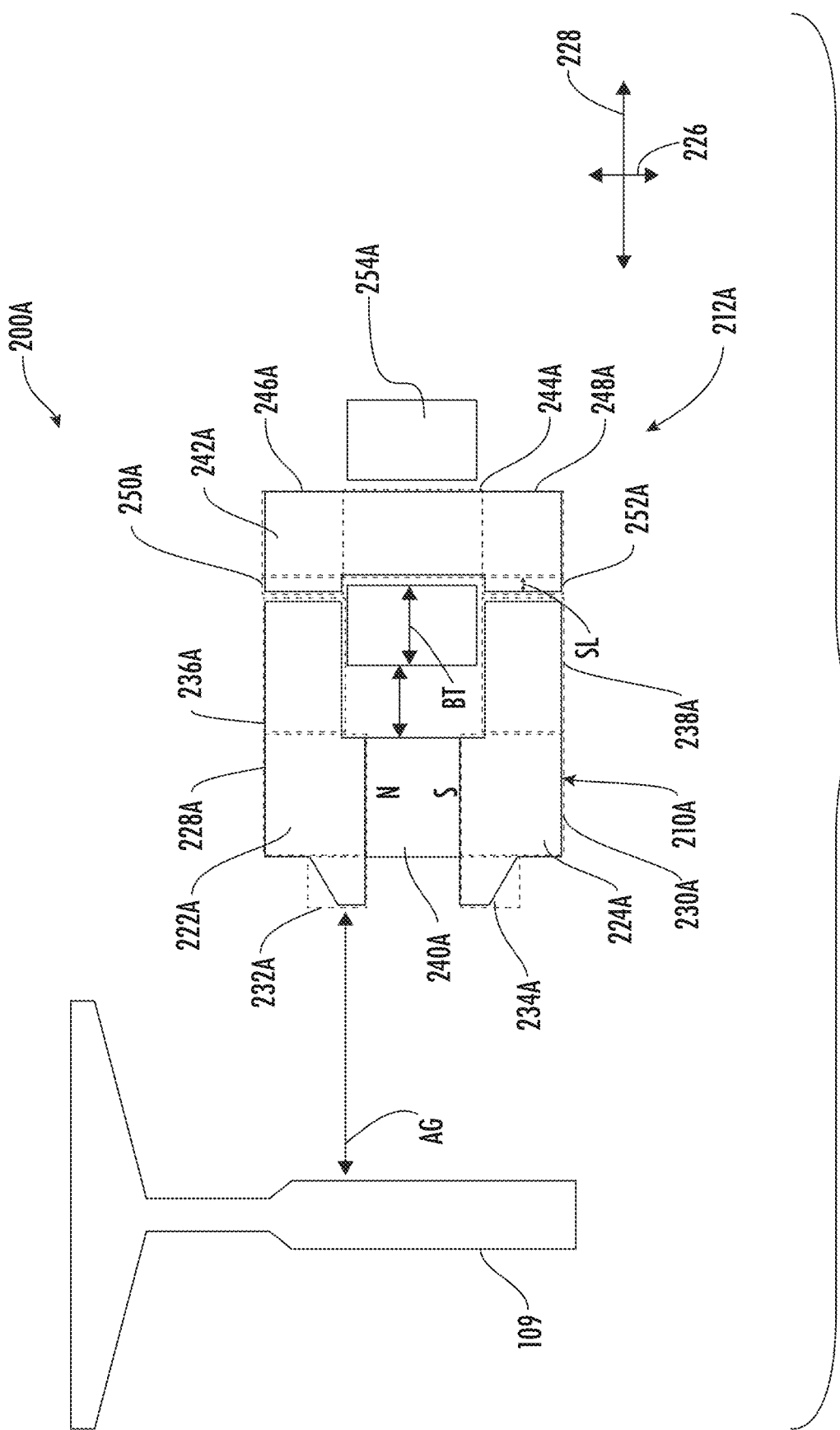

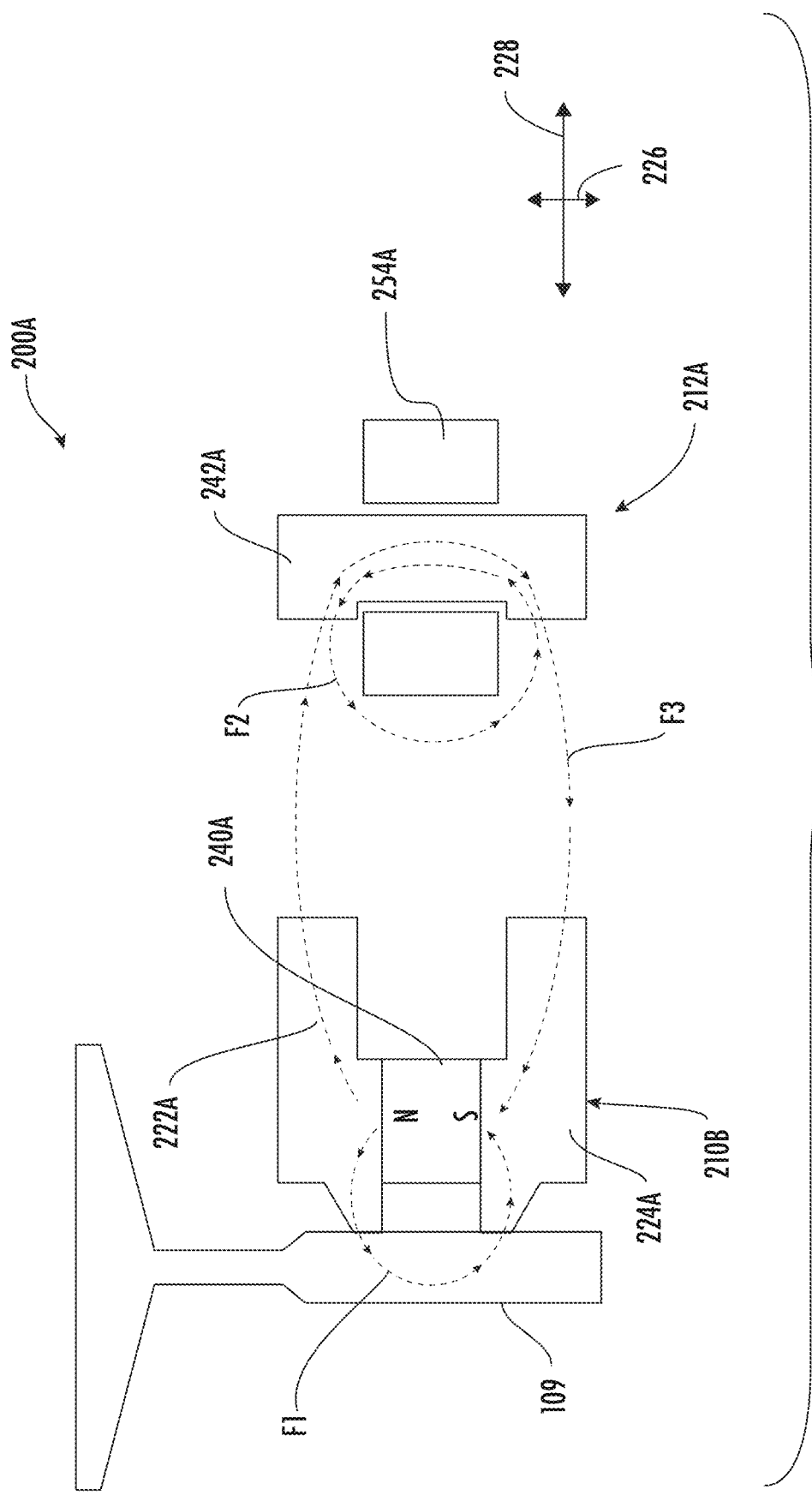

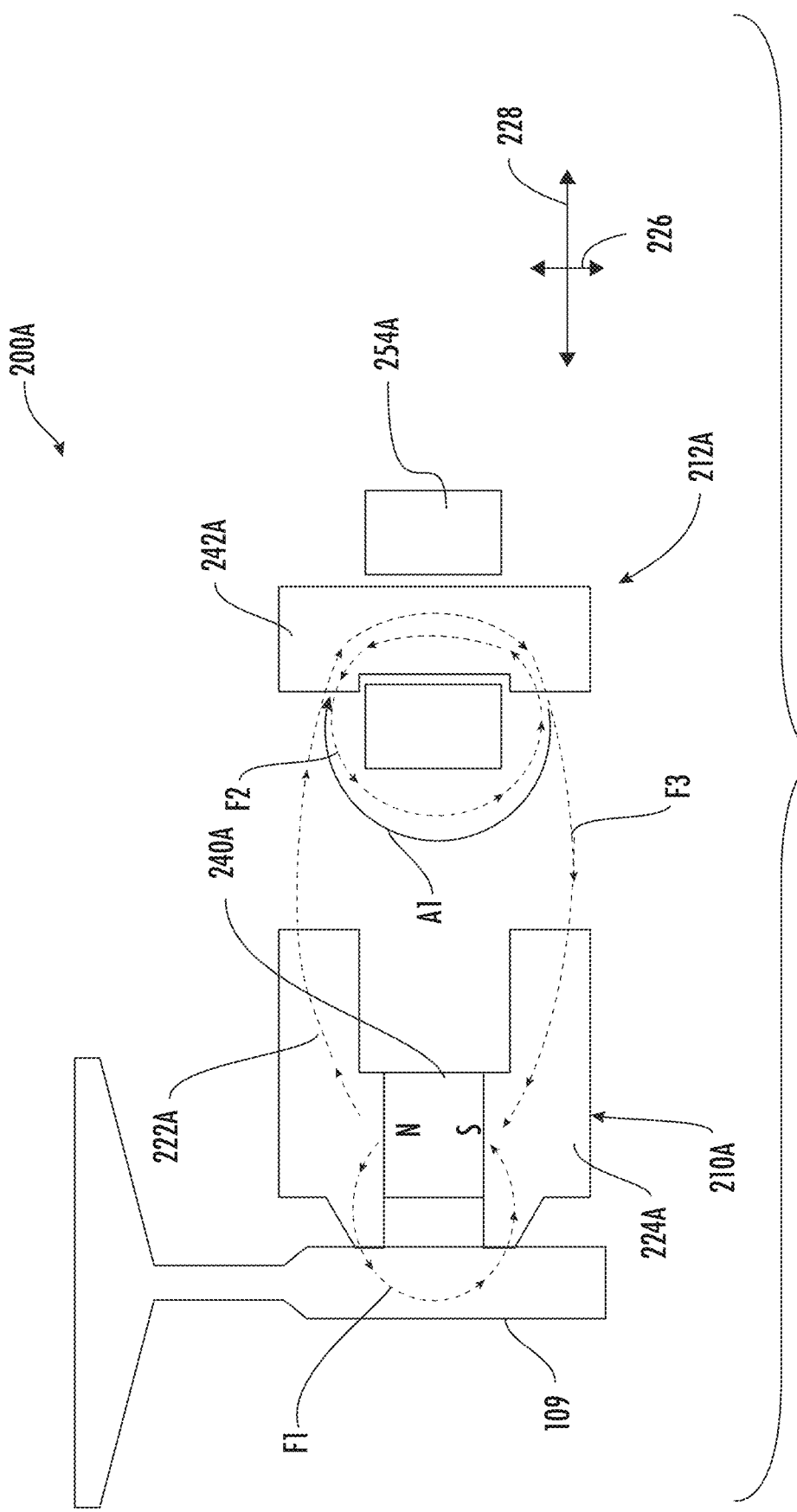

ELECTRONIC ACTUATION MODULE FOR ELEVATOR SAFETY BRAKE SYSTEM

BACKGROUND

The embodiments herein relate to elevator emergency brakes and more specifically to an electronic Actuation Module for an elevator safety brake system.

Safety regulations concerning the operation of elevators require an emergency brake (or safety brake) on the elevator car to stop the elevator in the event of an overspeed condition. The emergency brake progressively stops the vehicle by applying a frictional force to the hoistway rails guiding the vehicle. Cost effective and reliable emergency brakes are desired for all types of elevators, including high speed elevators which may float relative to the hoistway rail more than low speed elevators and thus have relatively large airgaps.

BRIEF SUMMARY

An electronic actuator for an elevator safety brake system, the actuator having: an electromagnet assembly; and a first magnet assembly configured for being retracted from engagement with a hoistway rail depending on an energized state of the electromagnet assembly, wherein the first magnet assembly includes: blocks spaced apart from each other in a transverse direction, respectively defining block bodies, and elongated block legs respectively extending aft from the block bodies; and a first magnet is disposed transversely between the block bodies; wherein the electromagnet assembly includes: a core that defines: a core body extending between core ends that are transversely spaced apart from each other; and core stub legs respectively extending forward from the core ends that are positioned adjacent to the elongated block legs when the first magnet assembly is retracted; and a coil winding wound about bobbins that are placed over the core body, wherein the elongated block legs are longer in a forward-aft direction than the core stub legs.

In addition to one or more aspects for the actuator, or as an alternate, the coil winding defines a coil winding thickness in the forward-aft direction and the core stub legs define a stub leg length in the forward-aft direction, wherein the stub leg length is less than 50% of the coil winding thickness.

In addition to one or more aspects for the actuator, or as an alternate, the stub leg length is less than 15% of the coil winding thickness.

In addition to one or more aspects for the actuator, or as an alternate, the elongated block legs and the core stub legs are configured so that when the first magnet assembly is retracted, the first magnet and the coil winding are spaced apart from each other in the forward-aft direction by a first clearance gap distance to define a first clearance gap therebetween.

In addition to one or more aspects for the actuator, or as an alternate, the actuator has a system housing that defines a hoistway rail engagement aperture wherein: the electromagnet assembly is disposed within the system housing, spaced apart from the hoistway rail engagement aperture; the first magnet assembly is disposed in the system housing between the electromagnet assembly and the hoistway rail engagement aperture, the first magnet assembly configured for being retracted into the system housing from engagement with the hoistway rail via the hoistway rail engagement aperture, when the electromagnet assembly, depending on its energized state, moves to engage the first magnet assembly; and a return biasing member is disposed between the system housing and the electromagnet assembly to bias into the system housing the electromagnet assembly and the first magnet assembly, which are stuck to each other via magnetism.

Further disclosed is a method of operating an electronic actuator of an elevator safety brake, the method having: energizing an electromagnet assembly of the electronic actuator, which attracts an electromagnet assembly of the electronic actuator to the magnet assembly; the electromagnet assembly moving forward, to engage an aft side of the magnet assembly, against the biasing of a return biasing member of the electronic actuator; elongated block legs of the first magnet assembly and core stub legs of the electromagnet assembly engaging each other from movement of the electromagnet assembly; and retracting, by biasing from the return biasing member, the first magnet assembly and the electromagnet assembly, which are magnetically stuck together.

In addition to one or more aspects for the method, or as an alternate, a coil winding of the electromagnet assembly defines a coil winding thickness in the forward-aft direction and the core stub legs define a stub leg length in the forward-aft direction, wherein the stub leg length is less than 50% of the coil winding thickness.

In addition to one or more aspects for the method, or as an alternate, wherein the stub leg length is less than 15% of the coil winding thickness.

In addition to one or more aspects for the method, or as an alternate, the elongated block legs and the core stub legs are configured so that when the first magnet assembly is retracted, the first magnet and the coil winding are spaced apart from each other in the forward-aft direction by a first clearance gap distance to define a first clearance gap therebetween.

In addition to one or more aspects for the method, or as an alternate, the electronic actuator includes a system housing that defines a hoistway rail engagement aperture, wherein: the electromagnet assembly is disposed within the system housing, spaced apart from the hoistway rail engagement aperture; the first magnet assembly is disposed in the system housing between the electromagnet assembly and the hoistway rail engagement aperture; and the return biasing member is disposed between the system housing and the electromagnet assembly, and the method includes: retracting the first magnet assembly and the electromagnet assembly, which are magnetically stuck together, into the system housing by biasing from the return biasing member.

Further disclosed is an electronic actuator for an elevator safety brake, having: an electromagnet assembly; and a first magnet assembly disposed forward of the electromagnet assembly and configured for being deployed to engage, and retracted from engagement with, a hoistway rail, depending on an energized sate of the electromagnet assembly, and a second magnet assembly disposed aft of the electromagnet assembly, wherein the first and second magnet assemblies are configured with a reverse polarity relative to each other.

In addition to one or more aspects for the actuator, or as an alternate, the first magnet assembly includes: blocks spaced apart from each other in a transverse direction, respectively defining block bodies, and block legs respectively extending aft from the block bodies; and the first magnet is disposed transversely between the block bodies; and the second magnet assembly includes: further blocks spaced apart from each other in the transverse direction, respectively defining further block bodies, and further block legs respectively extending forward from the further block bodies; and the second magnet is disposed transversely between the further block bodies.

In addition to one or more aspects for the actuator, or as an alternate, the electromagnet assembly has a core that is H-shaped to define legs that respectively engage the first through fourth block legs when the first magnet assembly and the electromagnet assembly are retracted.

In addition to one or more aspects for the actuator, or as an alternate, the core that defines: a core body extending between core ends that are transversely spaced apart from each other; core legs respectively extending forward from the core ends, to respectively engage the block legs; further core legs respectively extending aft from the core ends, to respectively engage the further block legs; a coil winding is wound about bobbins placed about the core body; and when the first magnet assembly and the electromagnet assembly are retracted, the first magnet and the coil winding are spaced apart from each other in a forward-aft direction by a first clearance gap distance to define a first clearance gap therebetween, and the second magnet and the coil winding are spaced apart from each other in the forward-aft direction by a second clearance gap distance to define a second clearance gap therebetween.

In addition to one or more aspects for the actuator, or as an alternate, the actuator includes a system housing that defines a hoistway rail engagement aperture, wherein: the electromagnet assembly is disposed within the system housing, spaced apart from the hoistway rail engagement aperture; the first magnet assembly is disposed in the system housing between the electromagnet assembly and the hoistway rail engagement aperture; the second magnet assembly is disposed in the system housing so that the electromagnet assembly is between the second magnet assembly and the hoistway rail engagement aperture; and the return biasing member is disposed between the system housing and the electromagnet assembly.

Further disclosed is a method of operating an electronic actuator of an elevator safety brake, the method having: a first magnet assembly of the electronic actuator, being magnetically attracted to an electromagnet assembly of the electronic actuator; return biasing member, of the electronic actuator, acting to retain the first magnet assembly; a second magnet assembly of the electronic actuator acting to retain the first magnet assembly due to magnetic attraction with the electromagnet assembly; energizing the electromagnet assembly to repel the first magnet assembly, moving it to the rail, and thereby increasing magnetic attraction of the electromagnet assembly to the first magnet assembly; energizing the electromagnet assembly to reverse its polarity, causing the electromagnet assembly to simultaneously be attracted to the first magnet assembly and be repelled from the second magnet assembly; the electromagnet assembly moving to contact the first magnet assembly from magnetic attraction therebetween; and the return biasing member biasing the electromagnet assembly moving to contact the first magnet assembly, stuck to each other by magnetism, back into the system housing In addition to one or more aspects for the method, or as an alternate, the first magnet assembly includes: blocks spaced apart from each other in a transverse direction, respectively defining block bodies, and block legs respectively extending aft from the block bodies; and the first magnet is disposed transversely between the block bodies; and the second magnet assembly includes: further blocks spaced apart from each other in the transverse direction, respectively defining further block bodies, and further block legs respectively extending forward from the further block bodies; and the second magnet is disposed transversely between the further block bodies.

In addition to one or more aspects for the method, or as an alternate, the electromagnet assembly has a core that is H-shaped to define legs that respectively engage the first through fourth block legs when the first magnet assembly and the electromagnet assembly are retracted.

In addition to one or more aspects for the method, or as an alternate, the core that defines: a core body extending between core ends that are transversely spaced apart from each other; core legs respectively extending forward from the core ends, to respectively engage the block legs; further core legs respectively extending aft from the core ends, to respectively engage the further block legs; a coil winding is wound about bobbins placed about the core body; and when the first magnet assembly and the electromagnet assembly are retracted, the first magnet and the coil winding are spaced apart from each other in a forward-aft direction by a first clearance gap distance to define a first clearance gap therebetween, and the second magnet and the coil winding are spaced apart from each other in the forward-aft direction by a second clearance gap distance to define a second clearance gap therebetween.

In addition to one or more aspects for the method, or as an alternate, the electronic actuator includes a system housing that defines a hoistway rail engagement aperture, wherein: the electromagnet assembly is disposed within the system housing, spaced apart from the hoistway rail engagement aperture; the first magnet assembly is disposed in the system housing between the electromagnet assembly and the hoistway rail engagement aperture; the second magnet assembly is disposed in the system housing so that the electromagnet assembly is between the second magnet assembly and the hoistway rail engagement aperture; and the return biasing member is disposed between the system housing and the electromagnet assembly.

BRIEF DESCRIPTION OF THE DRAWINGS

The present disclosure is illustrated by way of example and not limited in the accompanying figures in which like reference numerals indicate similar elements.

FIG. 3B is the FAM of FIG. 3A with the system housing removed;

FIG. 3C is the FAM of FIG. 3B with the permanent magnet assembly housing removed and the electromagnetic assembly housing removed;

FIG. 4B is the FAM of FIG. 4A with the permanent magnet assembly housing removed and the electromagnetic assembly housing removed;

FIG. 6A is a top schematic view of a FAM according to an embodiment;

FIG. 7 is another top schematic view of the FAM of FIG. 6, where a first permanent magnet assembly of the FAM has engaged a hoistway rail;

FIG. 8 is another top schematic view of the FAM of FIG. 7, where the first permanent magnet assembly of the FAM is in the process of being retracted back by an electromagnet assembly of the FAM;

DETAILED DESCRIPTION

Figure 1A:
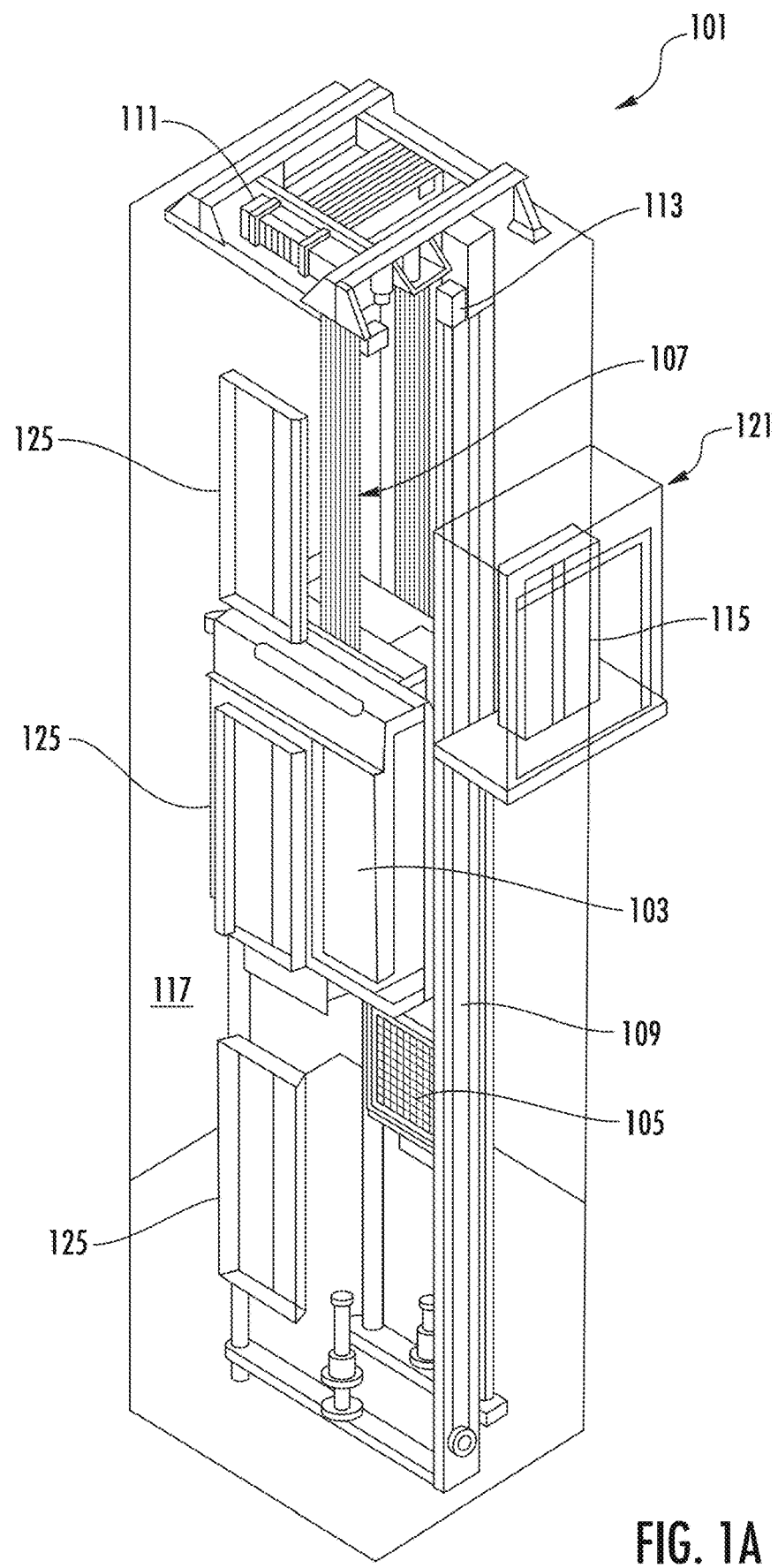
FIG. 1A is a schematic illustration of an elevator system that may employ various embodiments of the present disclosure.

FIG. 1A is a perspective view of an elevator system 101 including an elevator car 103, a counterweight 105, a tension member 107, a hoistway (or guide) rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the hoistway rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide hoistway rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along hoistway rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 1B:
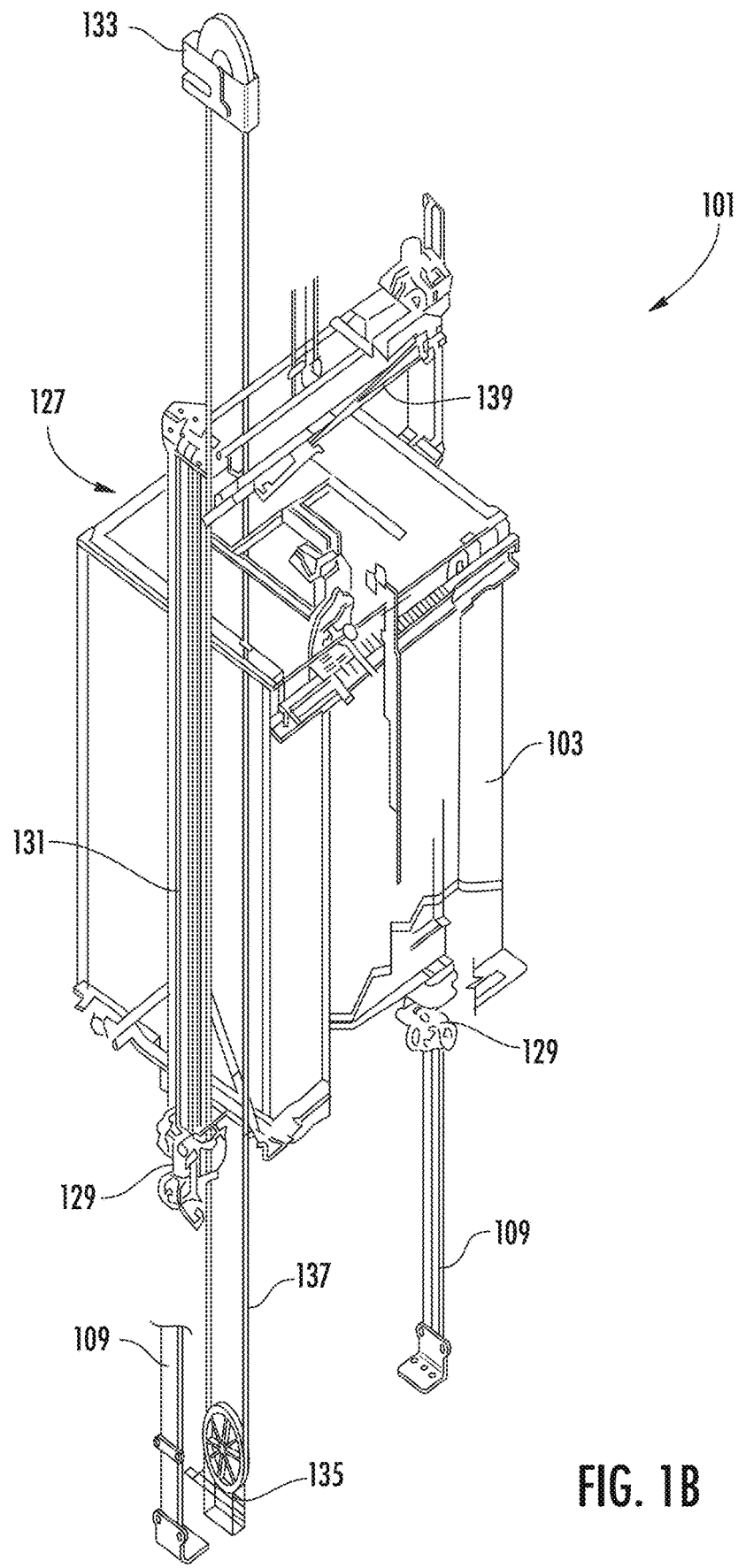
FIG. 1B is an example arrangement of an overspeed safety system for elevators.

Turning to FIG. 1B, a schematic illustration of an example elevator car overspeed safety system 127 of the elevator system 101 is shown. The elevator system 101 includes the elevator car 103 that is movable within the elevator shaft along guide rails 109. In this illustrative embodiment, the overspeed safety system 127 includes a pair of braking elements 129 that are engageable with the guide rails 109. The braking elements 129 are actuated, in part, by operation of lift rods 131. The triggering of the braking elements 129 is achieved through elevator governor 133, typically located at the top of the elevator shaft, which includes a tension device 135 located within the pit of the elevator shaft with a cable 137 operably connecting the governor 133 and the tension device 135. When an overspeed event is detected by the governor, the overspeed safety system 127 is triggered, and a linkage 139 is operated to actuate a combination of lift rods 131 simultaneously to cause actuation (e.g., self-engagement) of the braking elements 129 (e.g., safety wedges) that engage with the guide rail and cause a smooth and even stopping or braking force to stop the travel of the elevator car. As used herein the term "overspeed event" refers to an event during which a speed, velocity, or acceleration of an elevator car exceeds a predetermined threshold of the respective state of motion, and is not intended to be limited to constant speed, but rather also includes rates of change (e.g., acceleration) and also direction of travel of motion the elevator car (e.g., velocity). The linkage 139, as shown, is located on the top of the elevator car 103 and ensures simultaneous operation of the braking elements 129. However, in other configurations, the linkage may be located below a platform (or bottom) of the elevator car. As shown, various components are located above and/or below the elevator car 103, and thus pit space and overhead space within the elevator shaft must be provided to permit operation of the elevator system 101.

Figure 1C:
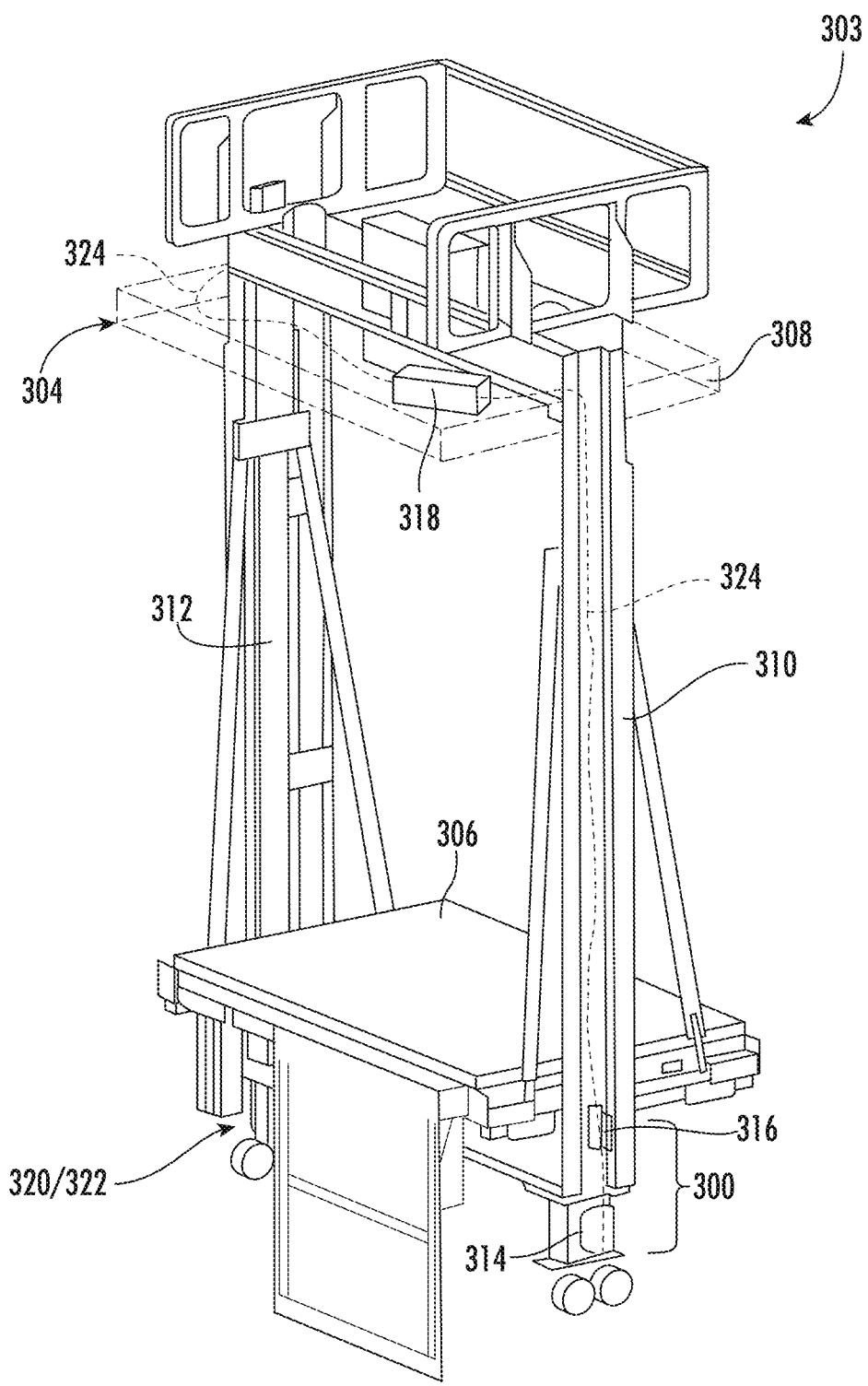
FIG. 1C is an isometric illustration of an elevator car frame having an overspeed safety system in accordance with an embodiment of the present disclosure.
Figure 1D:
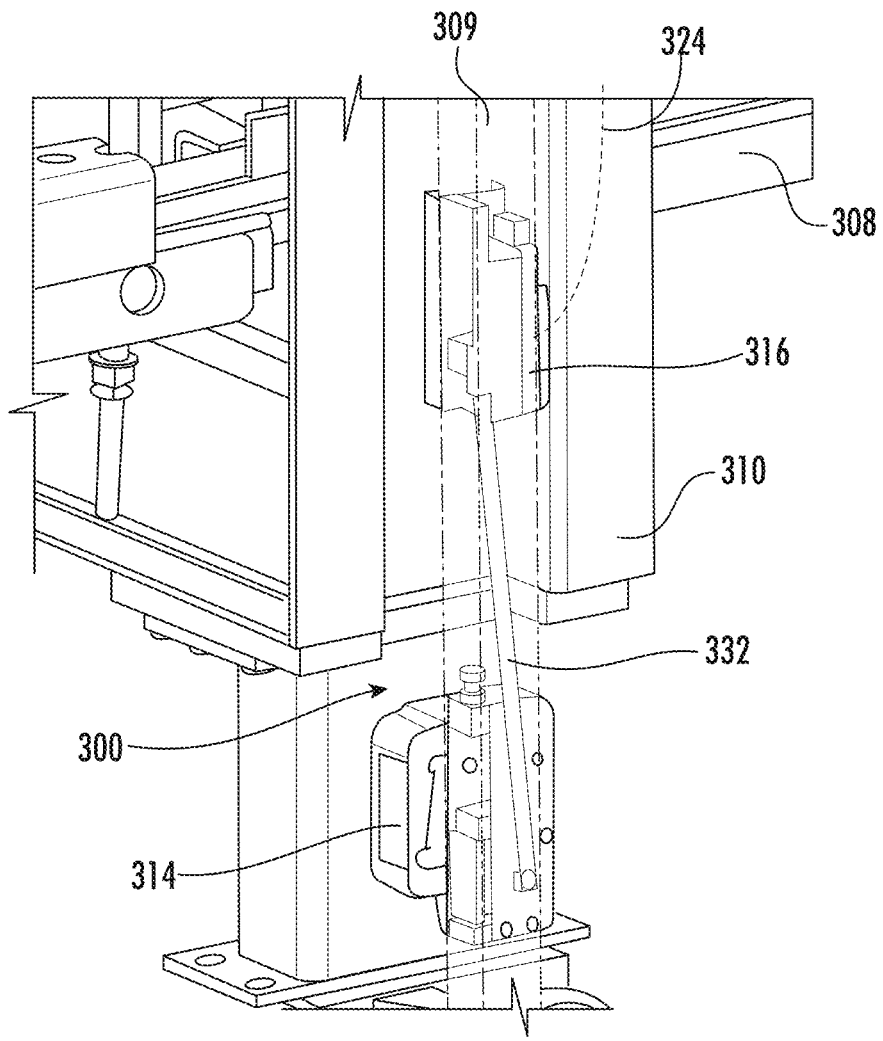
FIG. 1D is an enlarged illustrative view of a portion of the overspeed safety system of FIG. 1C.
Figure 2A:
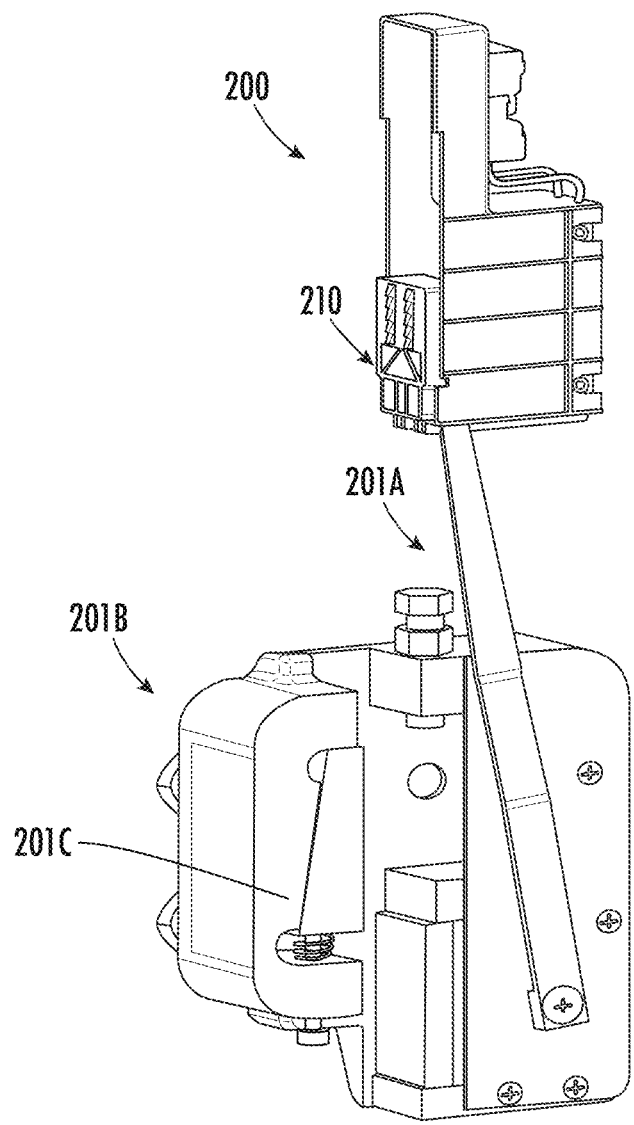
FIG. 2A is an example electronic actuator or Force Actuation Module (FAM) for an elevator brake system connected to a safety mechanism of the elevator brake system.
Figure 4A:
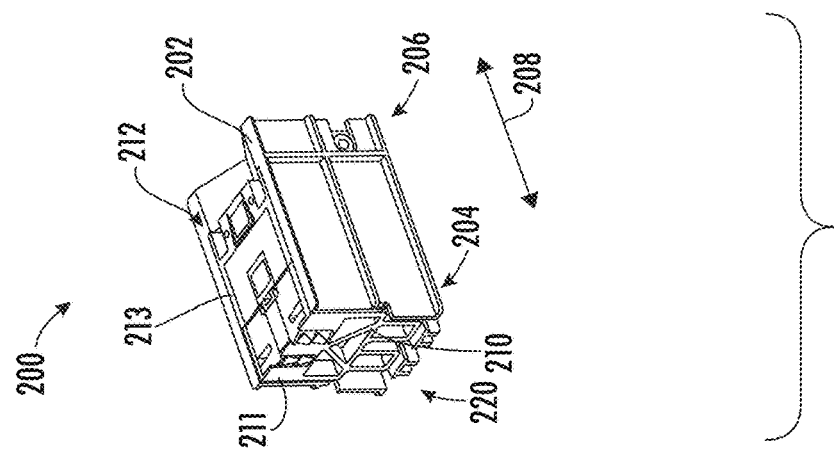
FIG. 4A is the FAM of FIG. 3 along view lines 4-4.
Figure 3A:
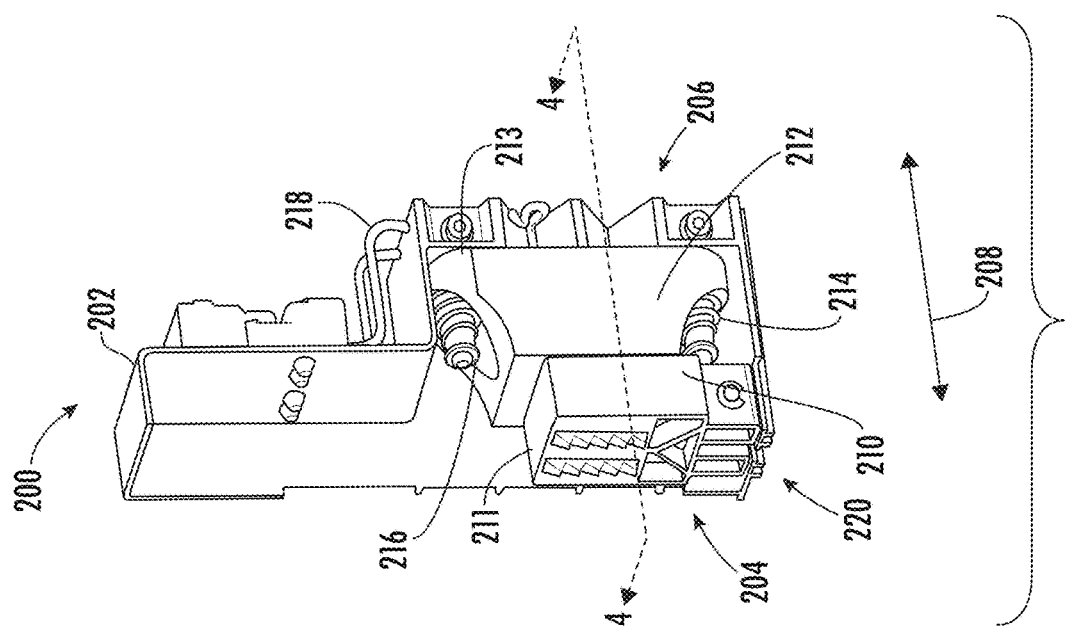
FIG. 3A is the FAM of FIG. 2B along view lines 3-3.
Figure 2B:
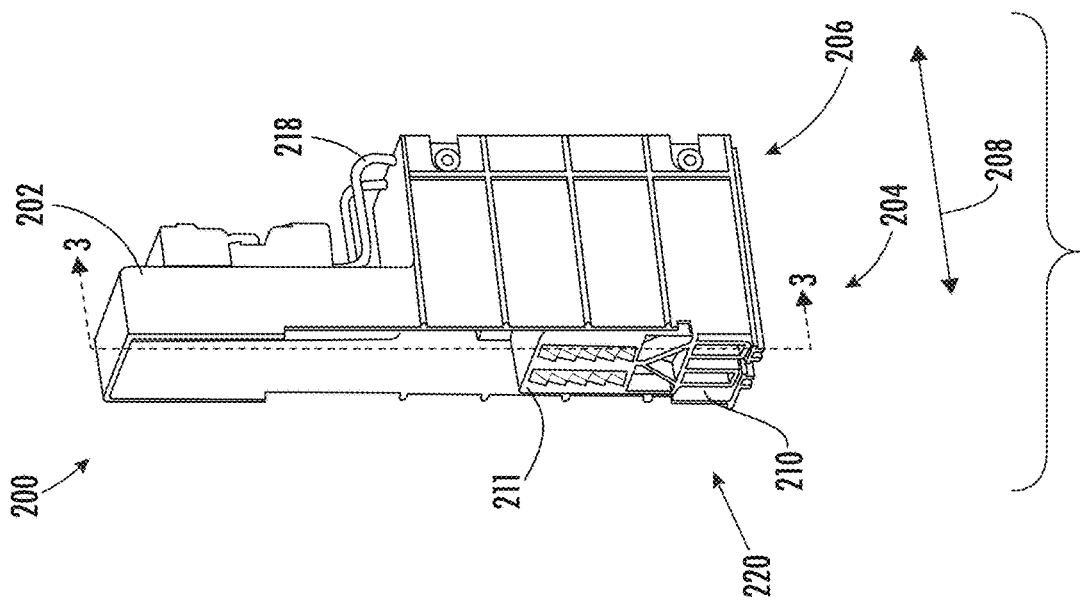
FIG. 2B is the FAM shown in FIG. 2A.

Turning now to FIGS. 1C-1D, schematic illustrations of an elevator car 303 having an overspeed safety system 300 in accordance with an embodiment of the present disclosure are shown. FIG. 1C is an isometric illustration of an elevator car frame 304 with the overspeed safety system 300 installed thereto. FIG. 1D is an enlarged illustration of a portion of the overspeed safety system 300 showing a relationship with a guide rail.

The car frame 304 includes a platform 306, a ceiling 308, a first car structural member 310, and a second car structural member 312. The car frame 304 defines a frame for supporting various panels and other components that define the elevator car for passenger or other use (i.e., define a cab of the elevator), although such panels and other components are omitted for clarity of illustration. The elevator car 303 is moveable along guide rails 309 (shown in FIG. 1D), similar to that shown and described above. The overspeed safety system 300 provides a safety braking system that can stop the travel of the elevator car 303 during an overspeed event.

The overspeed safety system 300 includes a first safety brake 314, a first electromechanical actuator 316 (or actuator 316) connected to it by a connecting rod 332, and a controller or control system 318 operably connected to the first electromechanical actuator 316. In one embodiment, the actuator 316 may include safety wedges typically found in a safety brake, such as the first safety brake 314, and is sized to produce sufficient braking forces so as to function as a safety brake.

The first safety brake 314 and the first electromechanical actuator 316 are arranged along the first car structural member 310. A second safety brake 320 and a second electromechanical actuator 322 are arranged along the second car structural member 312. The control system 318 is also operably connected to the second electromechanical actuator 322. The connection between the control system 318 and the electromechanical actuators 316, 322 may be provided by a communication line 324. The communication line 324 may be wired or wireless, or a combination thereof (e.g., for redundancy). The communication line 324 may be an electrical wire to supply electrical power from the control system 318 and an electromagnet of the first electromechanical actuator 316. It will be appreciated that in alternative configurations, the communication may be a wireless communication system, both for data/information and/or wireless power transfer.

As shown, the control system 318 is located on the top or ceiling 308 of the car frame 304. However, such position is not to be limiting, and the control system 318 may be located anywhere within the elevator system (e.g., on or in the elevator car, within a controller room, etc.). The control system 318 may comprise electronics and printed circuit boards for processing (e.g., processor, memory, communication elements, electrical buss, etc.). Thus, the control system 318 may have a very low profile and may be installed within ceiling panels, wall panels, or even within a car operating panel of the elevator car 303. In other configurations, the control system 318 may be integrated into various of the components of the overspeed safety system 300 (e.g., within or part of the electromechanical actuator 316).

The overspeed safety system 300 is an electromechanical system that eliminates the need for a linkage or linking element installed at the top or bottom of the elevator car. That is, the system 300 may replace a traditional governor system, including a governor, a governor rope and governor tension devices.

The control system 318 may include, for example, a printed circuit board with multiple inputs and outputs. In some embodiments, the control system 318 may include circuitry for a system for control, protection, and/or monitoring based on one or more programmable electronic devices (e.g., power supplies, sensors, and other input devices, data highways and other communication paths, and actuators and other output devices, etc.). The control system 318 may further include various components to enable control in the event of a power outage (e.g., capacitor/battery, etc.). The control system 318 may also include an accelerometer or other component/device to determine a speed of an elevator car (e.g., optical sensors, laser range finders, etc.). In such embodiments, the control system 318 is mounted to the elevator car, as shown in the illustrative embodiments herein.

The control system 318, in some embodiments, may be connected to and/or in communication with a car positioning system, an accelerometer mounted to the car (i.e., a second or separate accelerometer), and/or to the elevator controller. Accordingly, the control system 318 may obtain movement information (e.g., speed, direction, acceleration) related to movement of the elevator car along an elevator shaft. The control system 318 may operate independently of other systems, other than potentially receiving movement information, to provide a safety feature to prevent overspeed events.

The control system 318 may process the movement information provided by a car positioning system to determine if an elevator car is traveling at a speed in excess of a threshold speed. If the threshold is exceeded, the control system 318 will trigger the electromechanical actuators and the safety brakes. The control system 318 will also provide feedback to the elevator control system about the status of the overspeed safety system 300 (e.g., normal operational position/triggered position). It will be appreciated that although referred to as an "overspeed" system, the systems may be configured to determine if an elevator car is accelerating at a rate in excess of a threshold acceleration, and the term "overspeed" is not to be limiting to merely a constant rate of motion.

Thus, the overspeed safety system 300 of the present disclosure enables electrical and electromechanical safety braking in the event of overspeed conditions or events. The electrical aspects of the present disclosure enable the elimination of the physical/mechanical linkages that have traditionally been employed in overspeed safety systems. That is, the electrical connections allow for simultaneous triggering of two separate safety brakes through electrical signals, rather than relying upon mechanical connections and other components such as wheels, ropes, etc.

For additional illustrative context, FIGS. 2-5 will be addressed. FIG. 2A shows an example Force Actuation Module (FAM) 200, which is an electronic (or electromechanical) actuator (similar to the electromechanical actuator 316 disclosed above). The FAM 200 is connected by a safety linkage 201a (similar to the connecting rod 332 disclosed above) to a safety mechanism 201b (similar to the first safety brake 314 disclosed above). The FAM 200 provides the lifting force necessary to actuate the elevator safety mechanism 201b, which is one of the functions of the governor. That is, the FAM 200 generates a force that results in lifting of the safety wedges from the first safety brake 314, which is otherwise a function of the governor.

The elevator safety mechanism 201c then provides the braking force to bring an elevator to a stop in an emergency (e.g. runaway or freefall). A permanent magnet assembly 210 of the FAM 200 is deployed to the rail 109, magnetically sticks to the rail 109, and lifts the attached safety wedge or wedges 201c of the safety mechanism 201b. The safety mechanism 201b then brings the elevator car 103 to a stop. The permanent magnet assembly 210 of each FAM (one FAM 210A1 on a left side 226a of the elevator car 103 (FIG. 6B) and one FAM 210A2 on a right side 226B of the elevator car 103 (FIG. 6B)) is triggered at or above an overspeed threshold (in one non-limiting example, during runaway or freefall) and would do so if removing power from a motor or brake of the machine 111 (FIG. 1) proved ineffective in decelerating the elevator car 103.

The safety mechanism 201b is located below the FAM 200. The safety linkage connects a permanent magnet assembly 210 (discussed in greater detail below) of the FAM 200 to the safety wedge or wedges 201c of the safety mechanism 201b. The safety mechanism 201b could also be located above the FAM 200.

As shown in FIGS. 2B, 3A-3C and 4A, 4B the FAM 200 includes a system housing 202 (not shown in FIGS. 3B, 3C and 4B) with a housing forward side 204 and a housing aft side 206 spaced apart from one another in a forward-aft direction 208. A permanent magnet assembly 210 (or first magnet assembly) is disposed in the system housing forward side 204 of the system housing 202 and electromagnet assembly 212 is disposed aft of the permanent magnet assembly 210. The permanent magnet assembly 210 is disposed in a permanent magnet assembly housing 211 (not shown in FIGS. 3C and 4B) to maintain a configuration of components therein. An electromagnet assembly 212 is disposed in an electromagnet assembly housing 213 (not shown in FIGS. 3C and 4B) to maintain a configuration of components therein. Return biasing features 214, 216 (FIG. 3A) are disposed between the electromagnet assembly housing 213 and the system housing 202 to keep the electromagnet assembly housing 213 within the system housing 202 during operation.

In the illustrated embodiment the return biasing features 214, 216 are return springs connecting the electromagnet assembly 212B to the housing 202. In one embodiment, rather than return springs 214, 216, the return biasing members 214, 216 that bias the electromagnet assembly 212B to remain in the housing 202 may include, for example, implements (e.g., one or more pumps) that provide pneumatic or hydraulic pressure, or the utilization of elastomers or rubber springs. Leads 218 provide power to the electromagnet assembly 212. When engaging a hoistway rail 109 (FIG. 5) at least a portion of the permanent magnet assembly 210 travels through a hoistway rail engagement aperture 220 defined in the system housing forward side 204 of the system housing 202.

Figure 5:
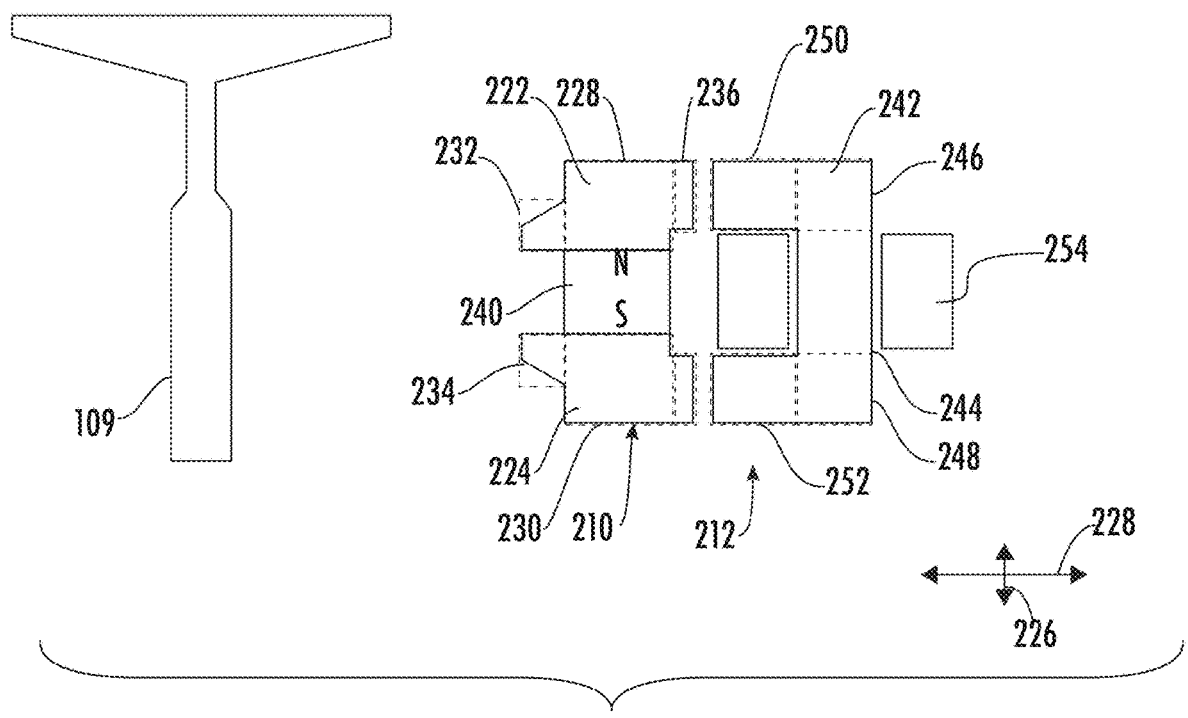
FIG. 5 is a top schematic view of the FAM of FIG. 4.

As shown in FIGS. 3C, 4B and 5, the permanent magnet assembly 210 includes first and second blocks 222, 224, which may be made of steel, spaced apart from each other in a transverse direction 226, which is normal to the forward-aft direction 208, respectively defining first and second block bodies 228, 230 (FIG. 5, outlined by respective dashed boxes). First and second block teeth 232, 234 (FIG. 5, outlined by respective dashed boxes) respectively extend forward from the first and second block bodies 228, 230. First and second block legs 236, 238 (FIG. 5, outlined by respective dashed boxes) respectively extend aft from the first and second block bodies 228, 230. A first permanent magnet 240 (first magnet) is disposed transversely between the first and second block bodies 228, 230.

The electromagnet assembly includes a core 242, which may be laminated steel, that defines a core body 244 (FIG. 5, outlined by a dashed box) between transversely spaced apart first and second core ends 246, 248 (FIG. 5, outlined by respective dashed boxes). First and second core legs 250, 252 (FIG. 5, outlined by respective dashed boxes) respectively extend forward from the first and second core ends 246, 248, to respectively engage the first and second block legs 236, 238. A coil winding 254 is wound about top and bottom bobbins 255A, 255B (FIGS. 3C, 4B) positioned against the core body 244.

As show in FIG. 5, the first and second core legs 250, 252 have a length in the forward-aft direction 208 that is equivalent to a thickness of the coil winding 254 in the forward-aft direction. As shown in greater details below, reducing the length of the first and second core legs 250, 252, may result in a more efficient utilization of magnetic flux for retracting the permanent magnet assembly 210 that is deployed against the hoistway rail 109.

Turning to FIGS. 6-9, according to an embodiment, a FAM 200A is shown for the elevator system 101. Features in FIGS. 2-5 not addressed in FIG. 6-9, including the system housing 202, the permanent magnet assembly housing 211, the electromagnet assembly housing 213 and the return biasing members 214, 216, are considered the same as those in FIGS. 2-5.

Turning to FIG. 6A, the FAM 200A includes an electromagnet assembly 212A. A first permanent magnet assembly 210A (or first magnet assembly) is configured for being retracted from engagement with the hoistway rail 109 when the electromagnet assembly 212A is an active energized state (i.e., when it is energized). The first permanent magnet assembly 210A includes first and second blocks 222A, 224A, spaced apart from each other in the transverse direction 226, respectively defining first and second block bodies 228A, 230A (outlined by respective dashed boxes). First and second block teeth 232A, 234A (outlined by respective dashed boxes) respectively extend forward from the first and second block bodies 228A, 230A, relative to the forward-aft direction 208. With this configuration, the permanent magnet assembly 210A has a friction interface. This friction interface may be in the form of a series of teeth. However, in one embodiment, there are other options for creating a friction interface, including an application of a super abrasive coating to a flat, toothless surface.

First and second elongated block legs 236A, 238A (outlined by respective dashed boxes) respectively extending aft from the first and second block bodies 228A, 230A. The first permanent magnet 240A is disposed transversely between the first and second block bodies 228A, 230A.

The electromagnet assembly 212A includes a core 242A that defines a core body 244A (outlined by a dashed box) extending between transversely spaced apart first and second core ends 246A, 248A (outlined by respective dashed boxes). First and second core stub legs 250A, 252A (outlined by respective dashed boxes) respectively extending forward from the first and second core ends 246A, 248A to engage (or be positioned adjacent to, in the forward-aft direction) the first and second elongated block legs 236A, 238A when the first permanent magnet assembly 210A is retracted. A coil winding 254A is wound about the core body 244A. The first and second elongated block legs 236A, 238A are longer in the forward-aft direction 208 than the first and second core stub legs 250A, 252A.

According to an embodiment, the winding 254A defines a coil winding thickness BT in the forward-aft direction 208 and the first and second core stub legs 250A, 252A define a stub leg length SL in the forward-aft direction 208. The stub leg length SL may be less than 50% of the coil winding thickness BT. The stub leg length SL may be also be more than or equal to 50% of the coil winding thickness BT. In one embodiment, wherein the stub leg length SL is less than 15% of the coil winding thickness BT. Thus, the core 242A may be rectangularly shaped.

The first and second elongated block legs 236A, 238A and the first and second core stub legs 250A, 252A are configured so that when the first permanent magnet assembly 210A is retracted, the first permanent magnet 240A and the coil winding 254A are spaced apart from each other in the forward-aft direction 208 by a first clearance gap distance G1 to define a first clearance gap therebetween. It would be undesirable for the permanent magnet 240a to collide with the core 242A during reset. Therefore, some clearance is required. In practice, this clearance might be quite minimal. Another gap is an air gap AG between the teeth 232A, 234A and the rail 109 when the permanent magnet assembly 210A is in a retracted state.

Figure 6B:
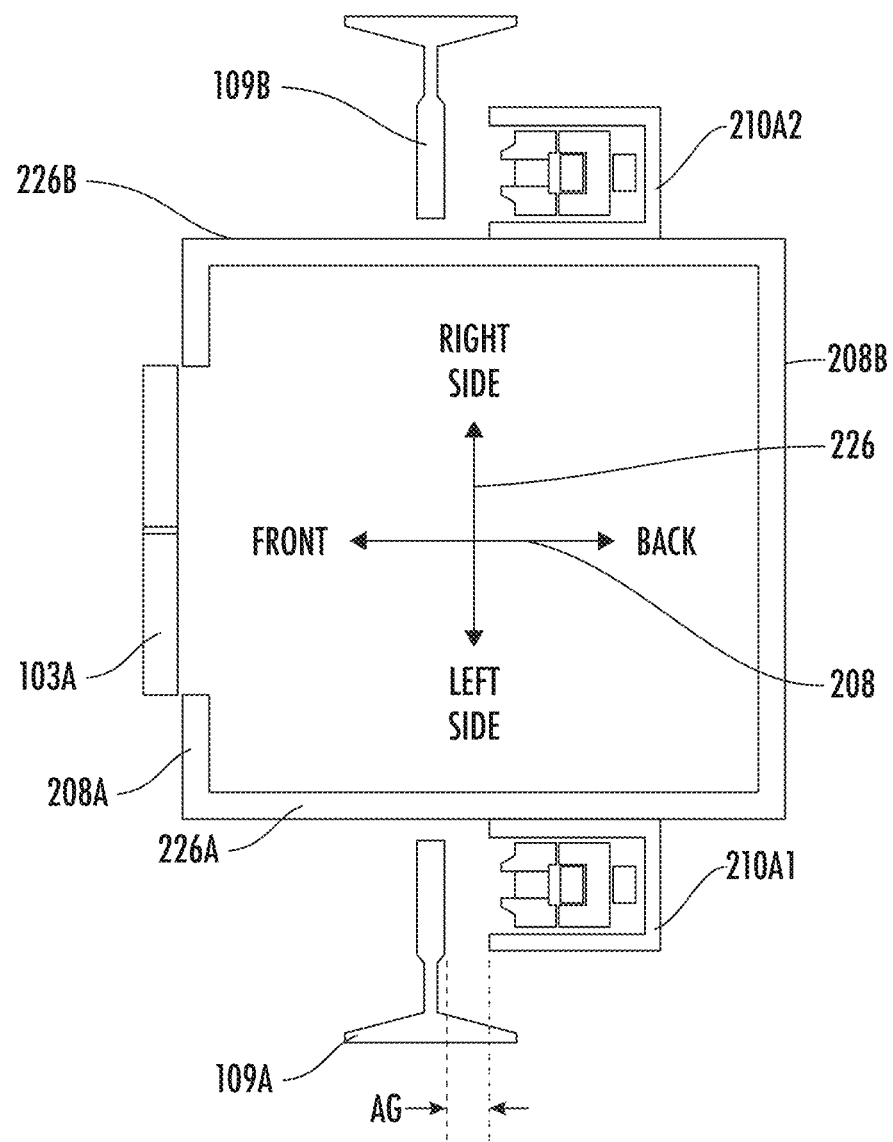
FIG. 6B is a top view of an elevator car equipped with left and right FAMs according to an embodiment.

FIG. 6B shows the elevator 103 and rails 109a, 109b (generally rail 109 in the remainder of this disclosure) in a top view. The figure shows the forward-aft axis 208, e.g., between front and back sides 208a, 208b of the elevator car 103, with elevator doors 103A at the front side 208a. The figure also shows the transvers axis 226, e.g., between the left to right sides 226a, 226b of the elevator car 103.

A top view of left and right FAMs 210A1, 210A2 (generally 210A) are shown with the air gap AG identified relative to the left FAM 210A1. The air gap AG may increase with elevator speed. As the elevator travels up and down within the hoistway, the car 103 may float in the forward-aft direction due to imperfections in rail alignment, installation, passenger motion, etc. In higher speed elevators this front-to-back air gap AG tends to be larger. This allows for a smoother ride. Limiting the front-to-back air gap AG, or traveling at faster speeds, may have the effect of deteriorating the ride quality, e.g., making the ride bumpier, for the passengers.

Turning to FIG. 7, three magnetic fields F1, F2, F3 that are present during the resetting of the FAM 200A are shown. The first field F1, which is a permanent magnetic-to-hoistway rail field, travels directionally out of the first permanent magnet 240A, through the hoistway rail 109, and back in to the first permanent magnet 240A. This first field F1 attracts the first permanent magnet assembly 210B to the hoistway rail 109 during an emergency stop. The second field F2 is a leakage flux, which begins and ends within the electromagnet assembly 212, traverses around the coil winding 254A and does not go through the permanent magnet assembly 210B. The second field F2, generated when retracting the first permanent magnet assembly 210A, does not assist in retracting the first permanent magnet assembly 210A. The third field F3, an electromagnet-to-permanent magnet field, travels directionally out of the core 242A, into the first permanent magnet 240A, out of the first permanent magnet 240A and into the core 242A. The third field F3 is useful in retracting the permanent magnet.

As shown in FIG. 8, the minimized length of each of the first and second core stub legs 250A, 252A, minimizes the effect of the second field F2, i.e., the electromagnet-to-winding field, by requiring it to travel through an amount of air (as shown by solid arrow A1). Increasing the distance A1 increases the magnetic reluctance of this magnetic loop, thereby reducing the related magnetic flux via the second field F2. The total available magnetic flux for creating the third field F3, i.e., the electromagnet-to-permanent magnet field, is increased. As a result, the FAM 200A will be more efficient and effective at resetting over larger airgaps that may exist between the core 242A and first permanent magnet 240A when the first permanent magnet 240A has engaged the elevator hoistway rail 109.

Figure 9:
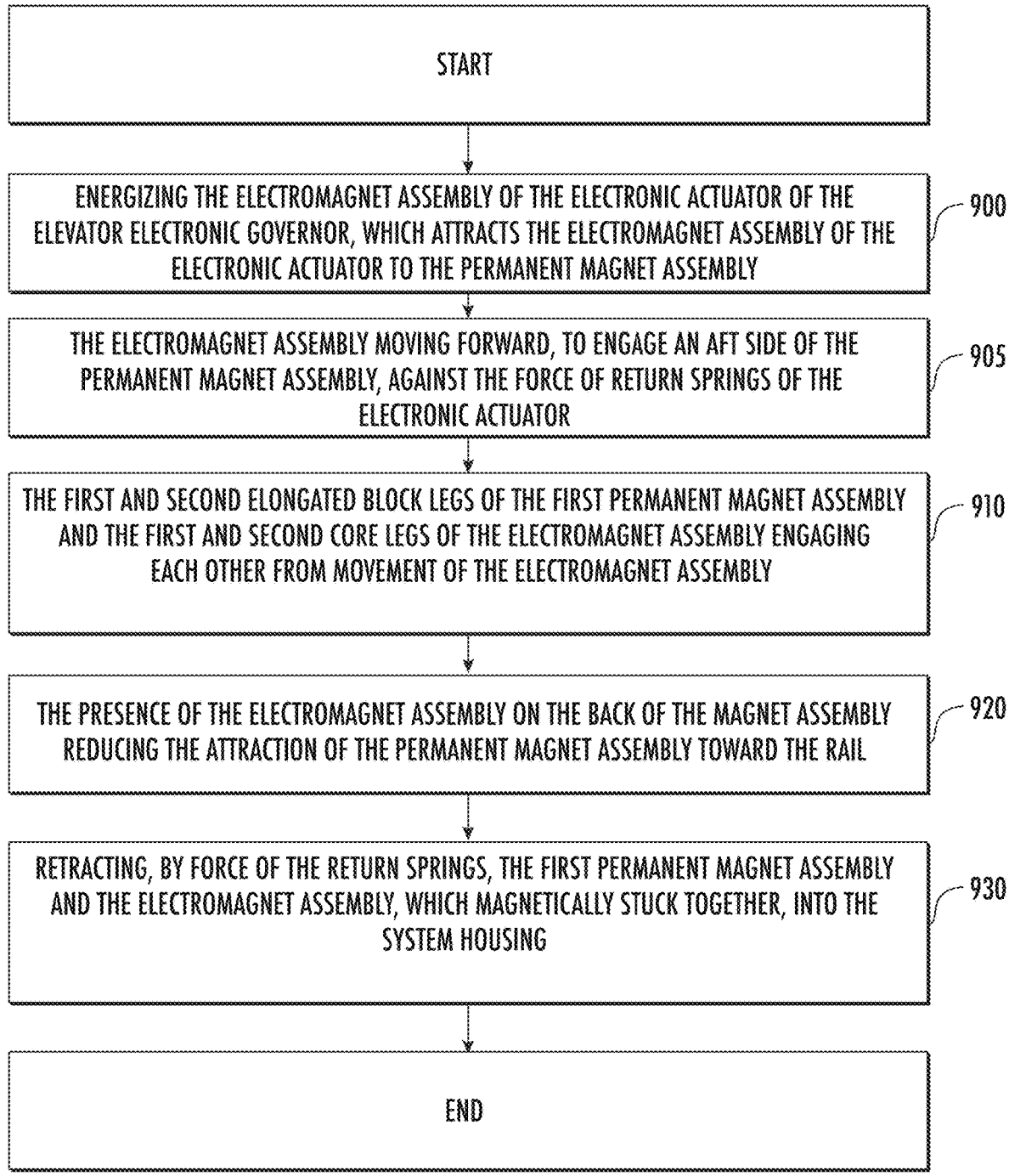
FIG. 9 is a flowchart showing a method of operating the FAM of FIG. 6.

FIG. 9 shows a method of operating an elevator system 101 equipped with the FAM of FIGS. 6-8. As shown in block 900, the method includes energizing the electromagnet assembly 212A of the electronic actuator 200 of the elevator governor. As a result, Field F3 is created, which attracts the electromagnet assembly 212A to the permanent magnet assembly 210A. As shown in block 905 the method includes the electromagnet assembly 212A moving forward, towards an aft side of permanent magnet assembly 210A, against the force of the return biasing members 214, 216. As shown in block 905 the method includes the electromagnet assembly 212A moving forward, to engage an aft side of the permanent magnet assembly 210A. As shown in block 910 the method includes the first and second elongated block legs 236A, 238A of the first permanent magnet assembly 210A and the first and second core stub legs 236A, 238A of the electromagnet assembly 212A engaging each other from movement of the electromagnet assembly.

As shown in block 920 the method includes the presence of the electromagnet assembly on the back of the magnet assembly 210A (and the current that might still be flowing through the coil windings 224 of the electromagnet assembly 212) reducing the attraction of the permanent magnet assembly 210A toward the rail 109. As shown in block 930, the method includes retracting, by force of the return biasing members 214, 216, the first permanent magnet assembly 210A and the electromagnet assembly 212A, which are magnetically stuck together, into the system housing 202.

The above disclosed embodiments pertain to a cost-effective design of a Force Actuation Module (FAM), which is an electronic actuator, and which may constitute part of an elevator governor subsystem that is able to reset over large airgaps. This may be advantageous for higher speed elevators where larger airgaps are present due to the increased front-to-back float. The core of the electromagnet assembly is I (capital i) shaped (or truncated C shaped), and the first magnet assembly has relatively long legs. An implementation of these features enables the core to be more effective during reset because the amount of leakage flux is significantly reduced.

Turning to FIGS. 10-14, according to another embodiment, a FAM 200B is shown for the elevator system 101. Features in FIGS. 2-5 not addressed in FIG. 10-14, including the system housing 202, the permanent magnet assembly housing 211, the electromagnet assembly housing 213 and the return biasing members 214, 216, are considered the same as those in FIGS. 2-5. The FAM 200A is utilized with the safety mechanism 210B (FIG. 2A), which may be located below the FAM 200A, and the safety linkage 201A that connects the permanent magnet assembly of the FAM 200B to the safety mechanism 201b (see FIG. 2A). The safety mechanism 201B could also be located above the FAM 200B.

Figure 10:
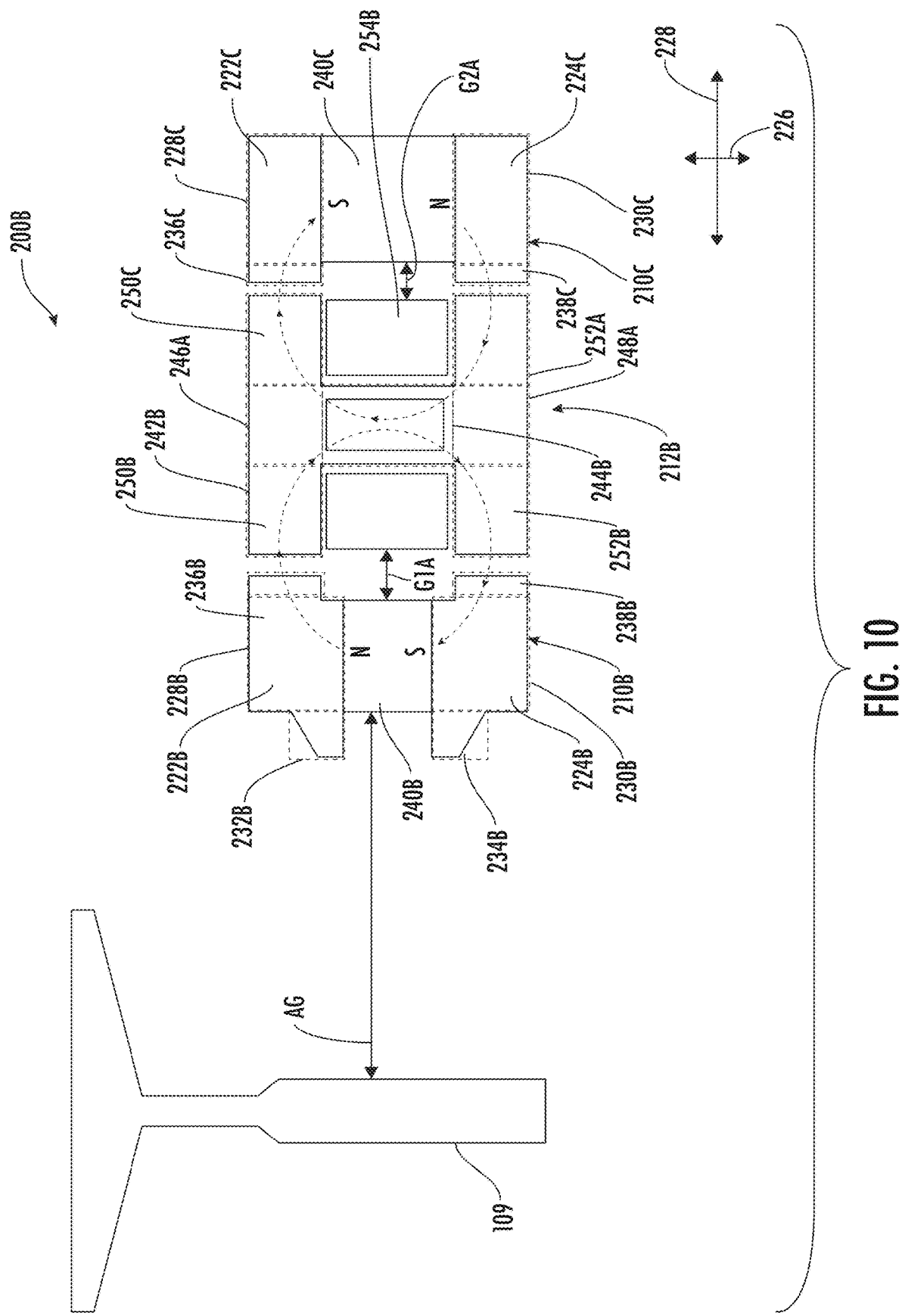
FIG. 10 is a top schematic view of a FAM according to another embodiment.

As shown in FIG. 10, a FAM 200B is shown for the elevator system 101. The FAM 200B includes an electromagnet assembly 212B. A first permanent magnet assembly 210B (or first magnet assembly) is disposed forward of the electromagnet assembly 212B, relative to the forward-aft direction 208. The first permanent magnet assembly 210B is configured for being deployed to engage, and retracted from engagement with, a hoistway rail 109, when the electromagnet assembly 212 is energized. A second permanent magnet assembly 210C (or second magnet assembly) is disposed aft of the electromagnet assembly 212B. The second permanent magnet assembly 210C is configured to attract the electromagnet assembly when deploying the first permanent magnet assembly 210B and to repel the electromagnet assembly 212B when retracting the first permanent magnet assembly 210B.

The first permanent magnet assembly 210B includes a first permanent magnet 240B (or first magnet). The second permanent magnet assembly 210C includes a second permanent magnet 240C (or second magnet). The polarity of the first and second permanent magnet assemblies 210B, 240B are reversed with respect to each other. More specifically, the first permanent magnet assembly 210B includes first and second blocks 222B, 224B spaced apart from each other in the transverse direction 226, respectively defining first and second block bodies 228B, 230B (outlined by respective dashed boxes). First and second block teeth 232B, 234B (outlined by respective dashed boxes) respectively extend forward from the first and second block bodies 228B, 230B. With this configuration, as indicated above, the permanent magnet assembly 210A has a friction interface. This friction interface may be in the form of a series of teeth. However, in one embodiment, there are other options for creating a friction interface, including an application of a super abrasive coating to a flat, toothless surface.

First and second block legs 236B, 238B (outlined by respective dashed boxes) respectively extending aft from the first and second block bodies 228B, 230B. The first permanent magnet 240B is disposed transversely between the first and second block bodies 228B, 230B.

The second permanent magnet assembly 210C includes third and fourth (further) blocks 222, 224 spaced apart from each other in the transverse direction 226, respectively defining third and fourth (further) block bodies 228C, 230C (outlined by respective dashed boxes). Third and fourth (further) block legs 236C, 238C (outlined by respective dashed boxes) respectively extend forward from the third and fourth block bodies 228C, 230C. The second permanent magnet 240C is disposed transversely between the third and fourth block bodies 228C, 230C. The electromagnet assembly 212B has a core 242B that is H-shaped to define legs 250B, 252B, 250C, 252C that respectively engage the first through fourth block legs 236B, 238B, 236C, 238C when the first permanent magnet assembly 210B and the electromagnet assembly 212B are retracted. More specifically, the electromagnet assembly 212B includes the core 242B that defines a core body 244B (outlined by a dashed box) extending between transversely spaced apart first and second core ends 246B, 248B (outlined by respective dashed boxes). First and second core legs 250B, 252B (outlined by respective dashed boxes) respectively extend forward from the first and second core ends 246B, 248B, to respectively engage the first and second block legs 236B, 238B. Third and fourth (further) core legs 250C, 252C (outlined by respective dashed boxes) respectively extend aft from the first and second core ends 246B, 248B, to respectively engage the third and fourth block legs 236C, 238C.

The coil winding 254B is wound about the bobbins (see FIGS. 3C, 4B) placed about the core body 244B. When the first permanent magnet assembly 210B and the electromagnet assembly 212B are retracted, the first permanent magnet 240B and winding 254B are spaced apart from each other in a forward-aft direction by a first clearance gap distance G1A to define a first clearance gap. The second permanent magnet 240C and coil winding 254B are spaced apart from each other in the forward-aft direction 208 by a second clearance gap distance G2A to define a second clearance gap. As illustrated, in the forward-aft direction 208, the first and second clearance gaps have different sizes such that the first clearance gap distance G1A is larger than the second clearance-gap distance G2A. However, this configuration is not intended on limiting the scope of the disclosed embodiments. An air gap AG is between the permanent magnet assembly 210B and the rail 109. As indicated above, the airgap AG tends to be larger for higher speed elevators. More specifically, the front-to-back airgap AG may be defined by the distance between the teeth 232B, 234B of the permanent magnet assembly 210B and the rail 109.

As shown in FIG. 10, in normal operation, the first permanent magnet assembly 210B is magnetically attracted to the electromagnet assembly 212B because the core is made of steel. Additionally, return biasing members 214, 216 (FIG. 3) biasing the electromagnet assembly 212B to retain it within the system housing 202. As indicated, in embodiments, the return biasing members 214, 216 may be return springs, implements providing pneumatic or hydraulic pressure, or elastomers or rubber springs, connecting the electromagnet assembly 212B to the housing 202. Further, the second permanent magnet assembly 210C also acts to retain the electromagnet assembly 212B within the system housing 202 because the core 242B is attracted to it.

Figure 11:
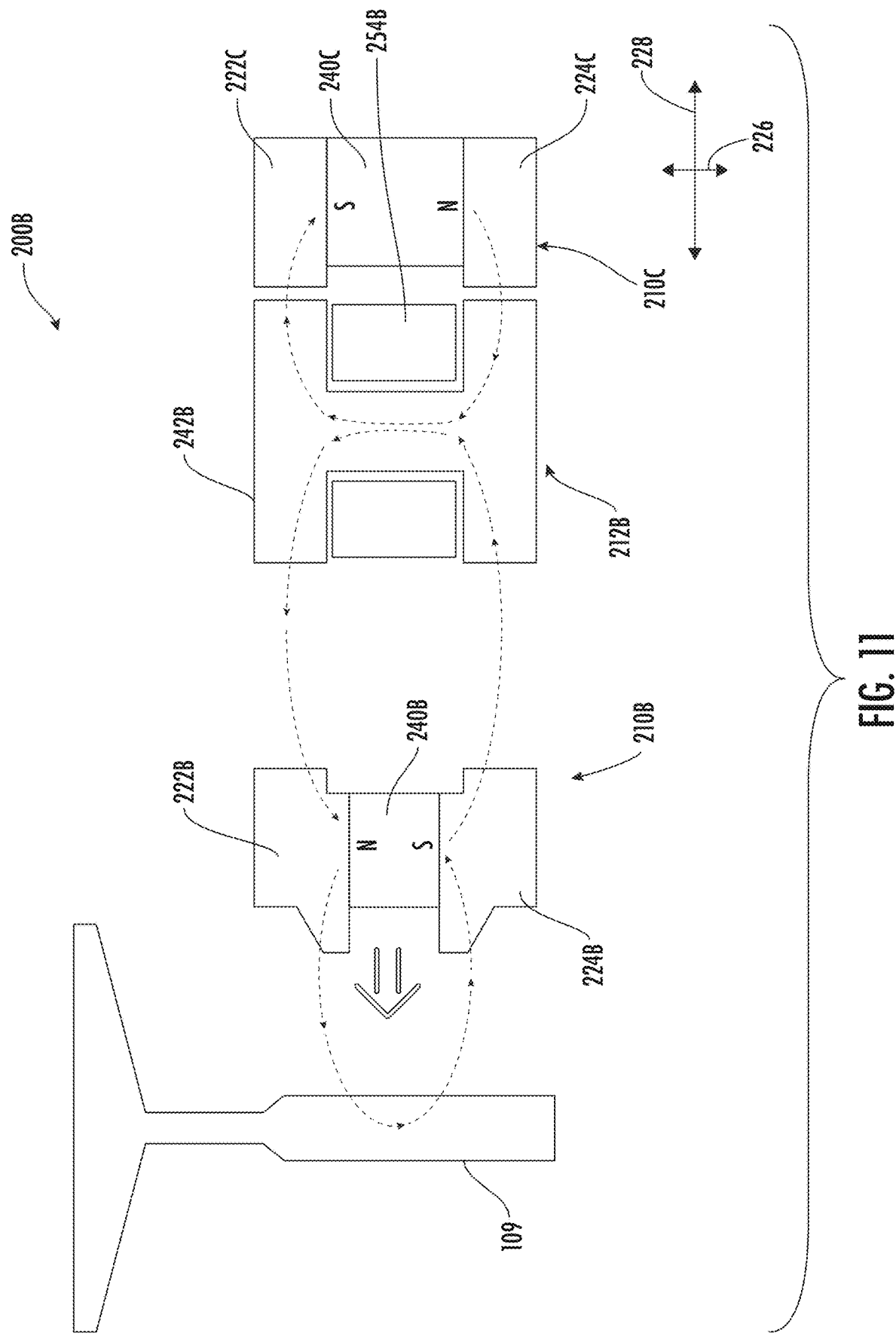
FIG. 11 is another top schematic view of the FAM of FIG. 9, where a first permanent magnet assembly of the FAM is being deployed to engage the hoistway rail.

As shown in FIG. 11, when the electromagnet assembly 212B deploys the first permanent magnet assembly 210B (also referred to as a trigger state), current in the core 242B acts to repel the first permanent magnet assembly 210B, moving it forward to the hoistway rail 109. At the same time, the current also increases the attraction of the electromagnet assembly 212B to the second permanent magnet assembly 210C. That is, magnetic flux flows out of the core 242B, through the first permanent magnet 240B, while flowing into through the second permanent magnet 240C.

Figure 12:
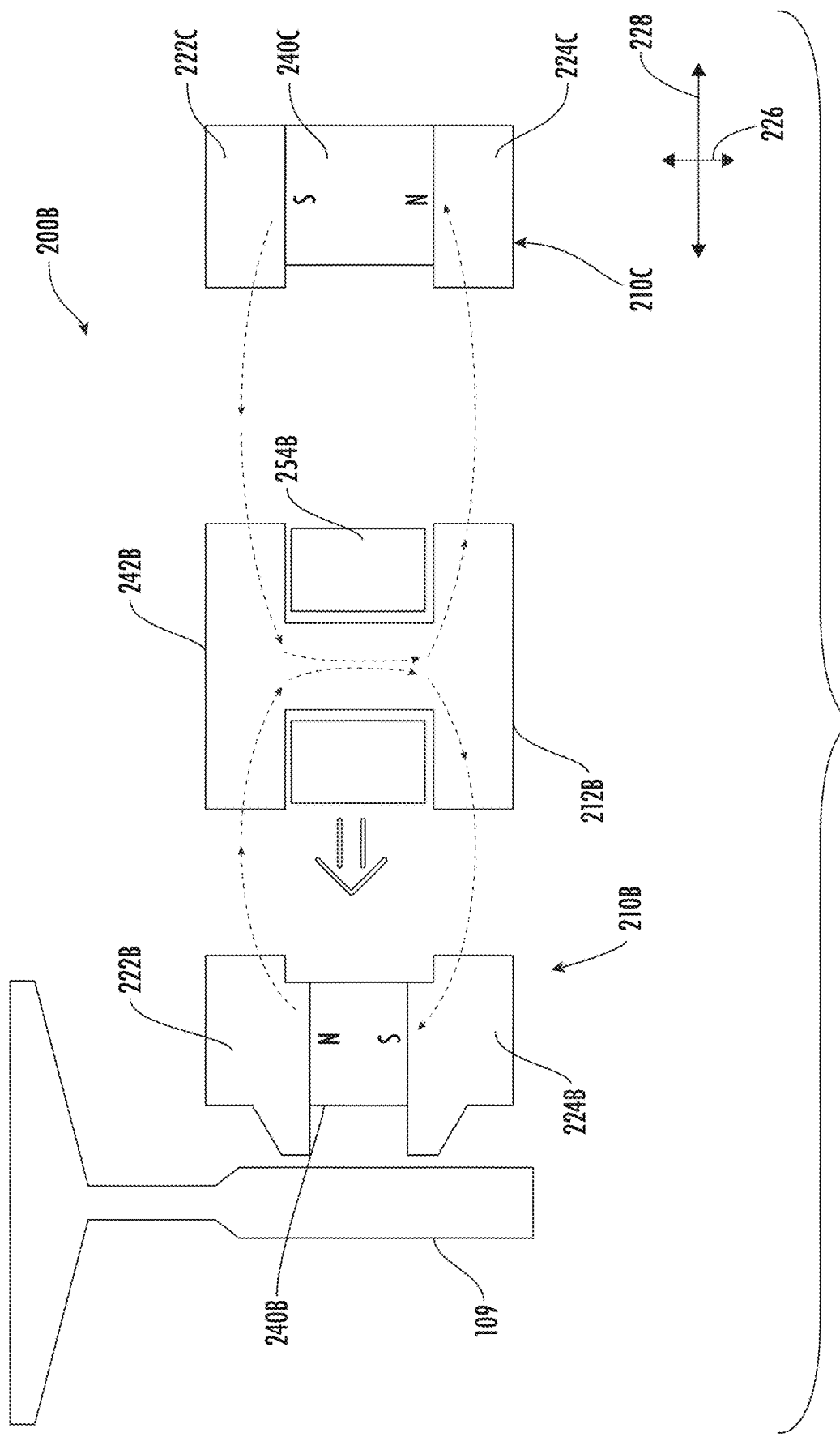
FIG. 12 is another top schematic view of the FAM of FIG. 9, where an electromagnet assembly of the FAM is deployed to engage the first permanent magnet assembly from repulsive interactions with a second permanent magnet assembly of the FAM, where the second permanent magnet assembly remains in a stationary position.

As shown in FIG. 12, when the electromagnet assembly 212B is in a reset state, to retract the first permanent magnet assembly 210B, current in the electromagnet assembly 212B is reversed. This causes the electromagnet assembly 212B to simultaneously be attracted to the first permanent magnet assembly 210B and be repelled from the second permanent magnet assembly 210C. That is, the magnetic flux flows out of the core 242B, which is revered from the trigger state, through the first permanent magnet 240B. At the same time, magnetic flux flows through the second permanent magnet 240C.

Figure 13:
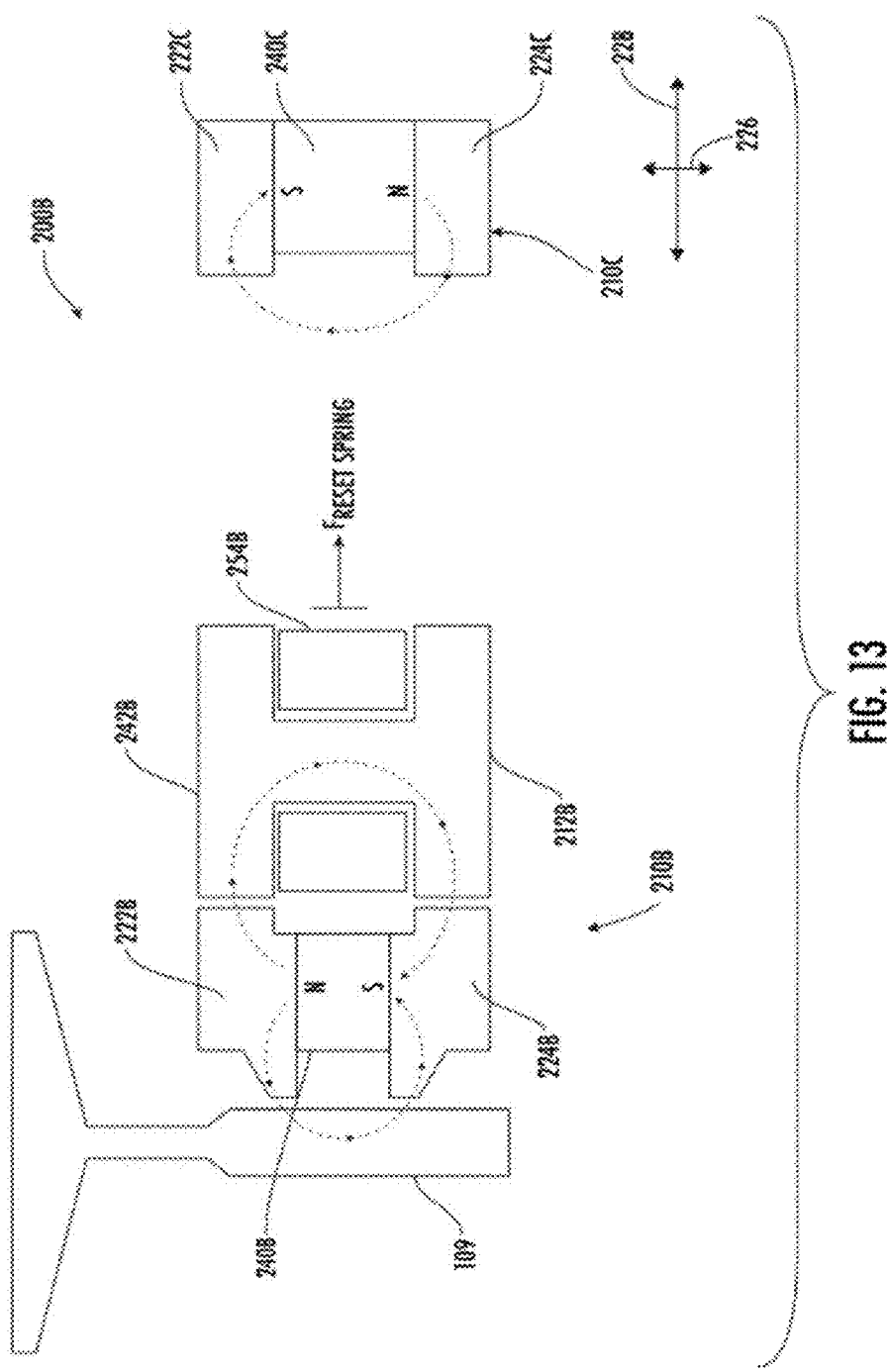
FIG. 13 is another top schematic view of the FAM of FIG. 9, where the electromagnet assembly has engaged the first permanent magnet assembly to retract the first permanent magnet assembly from the hoistway rail.

As shown in FIG. 13, once the electromagnet assembly 212B contacts the first permanent magnet assembly 210B, the first permanent magnet assembly's 210B attraction to the rail decreases. A spring reset force (F-reset spring) is provided by the return springs 214, 216 (FIG. 3) to bias the first permanent magnet assembly 210B and the electromagnet assembly 212B back into the system housing 202 (e.g., FIG. 2).

Figure 14:
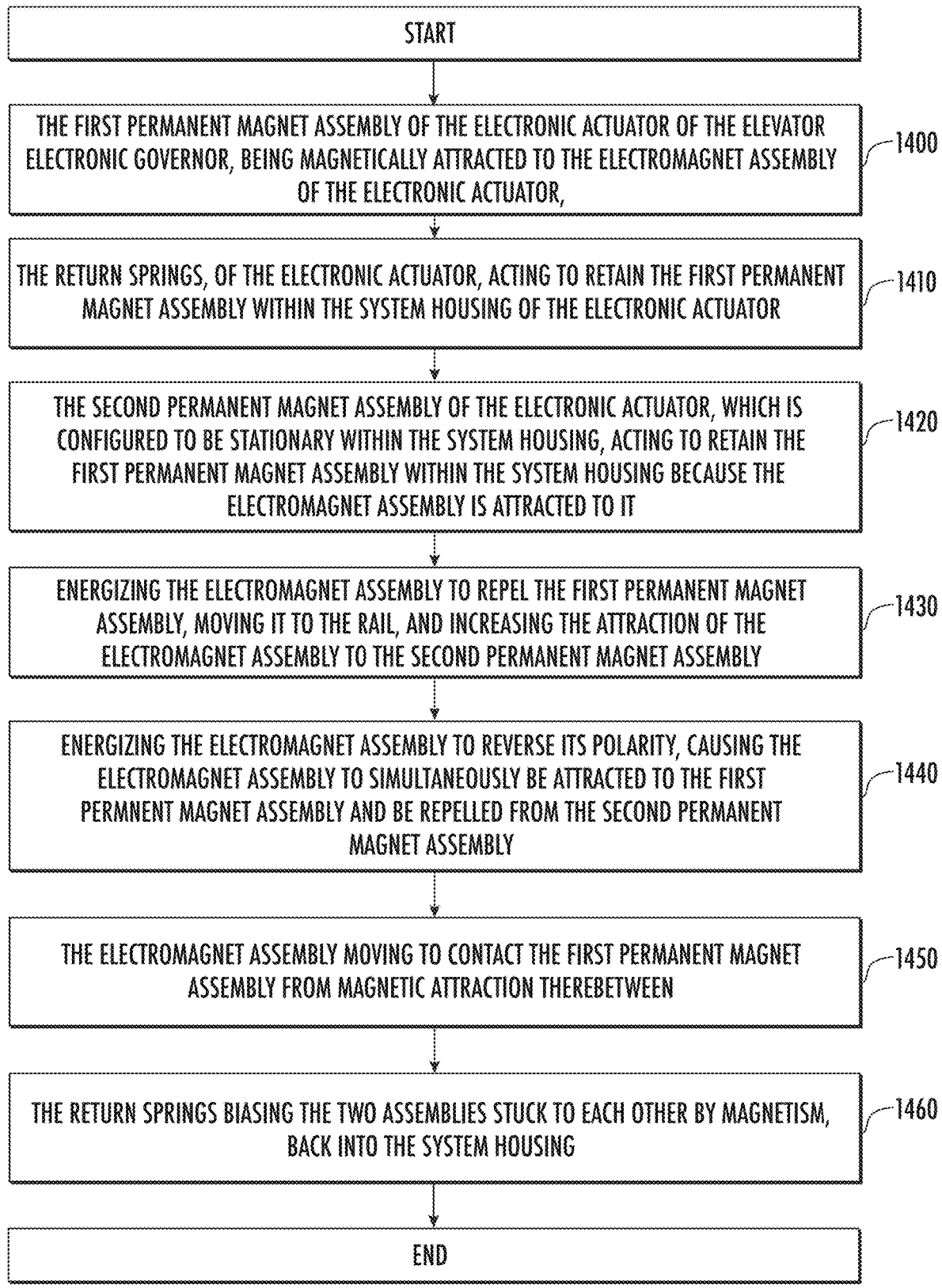
FIG. 14 is a flowchart showing a method of operating the FAM of FIG. 10.

FIG. 14 shows a method of operating a FAM 200B for an elevator governor 133 of an elevator system 101. As shown in block 1400, the method includes the first permanent magnet assembly 210B of the electronic actuator 200B, being magnetically attracted to the electromagnet assembly 212B of the electronic actuator 200B. As shown in block 1410, the method includes the return springs 214, 216, of the electronic actuator 200B, acting to retain the first permanent magnet assembly 210B within the system housing 202 of the electronic actuator 200B. As shown in block 1420 the method includes the second permanent magnet assembly 210C of the electronic actuator 200B, which is configured to be stationary within the system housing 202, acting to retain the first permanent magnet assembly 210B within the system housing 202 because the electromagnet assembly 212B is attracted to it. As shown in block 1430, the method includes energizing the electromagnet assembly 212B to repel the first permanent magnet assembly 210B, moving it to the rail 109, and increasing the attraction of the electromagnet assembly 212B to the second permanent magnet assembly 210B. In one embodiment, the electromagnet assembly 212B is normally energized to actively retain the first permanent magnet assembly 210B within the system housing 202. In such embodiment, the first permanent magnet assembly 210B may be deenergized (or deenergized state) to thereby push the first permanent magnet assembly 210B to the rail 109.

As shown in block 1440, the method includes energizing the electromagnet assembly 212B to reverse its polarity, causing the electromagnet assembly 212B to simultaneously be attracted to the first permanent magnet assembly 210B and be repelled from the second permanent magnet assembly 210C. As shown in block 1450 the method includes the electromagnet assembly 212B contacting the first permanent magnet assembly 210B. As shown in block 1460 the method includes the return springs 214, 216 to bias the two assemblies 210B, 212B, stuck to each other by magnetism, back into the system housing 202.

The above disclosed embodiments pertain to a FAM 200B that is able to trigger and reset over large airgaps. This is particularly advantageous for higher speed elevators where larger airgaps are present due to the increased front-to-back float. This actuation over larger airgaps is enabled by the inclusion of the second permanent magnet assembly 210C, that is stationary. The core 242B, rather than being C-shaped, is H-shaped.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electronic actuator for an elevator safety brake system, the actuator comprising:
   an electromagnet assembly; and
   a first magnet assembly configured for being retracted from engagement with a hoistway rail depending on an energized state of the electromagnet assembly,
   wherein the first magnet assembly includes: blocks transversely spaced apart from each other, respectively defining block bodies, and elongated block legs respectively extending aft from the block bodies; and a first magnet is disposed transversely between the block bodies;
   wherein the electromagnet assembly includes: a core that defines: a core body extending between core ends that are transversely spaced apart from each other; and core stub legs respectively extending forward from the core ends that are positioned adjacent to the elongated block legs when the first magnet assembly is retracted; and a coil winding wound about bobbins that are placed over the core body, wherein the elongated block legs are longer in a forward-aft direction than the core stub legs,
   wherein:
   the coil winding defines a coil winding thickness in the forward-aft direction and the core stub legs define a stub leg length in the forward-aft direction, wherein the stub leg length is less than 50% of the coil winding thickness.

2. The actuator of claim 1, wherein:
   the stub leg length is less than 15% of the coil winding thickness.

3. The actuator of claim 1, wherein:
   the elongated block legs and the core stub legs are configured so that when the first magnet assembly is retracted, the first magnet and the coil winding are spaced apart from each other in the forward-aft direction by a first clearance gap distance to define a first clearance gap therebetween.

4. The actuator of claim 1, comprising
   a system housing that defines a hoistway rail engagement aperture wherein:
   the electromagnet assembly is disposed within the system housing, spaced apart from the hoistway rail engagement aperture;
   the first magnet assembly is disposed in the system housing between the electromagnet assembly and the hoistway rail engagement aperture,
   the first magnet assembly configured for being retracted into the system housing from engagement with the hoistway rail via the hoistway rail engagement aperture, when the electromagnet assembly, depending on its energized state, moves to engage the first magnet assembly; and
   a return biasing member is disposed between the system housing and the electromagnet assembly to bias into the system housing the electromagnet assembly and the first magnet assembly, which are stuck to each other via magnetism.

5. A method of operating an electronic actuator of an elevator safety brake, the method comprising:
   energizing an electromagnet assembly of the electronic actuator, which attracts the electromagnet assembly of the electronic actuator to a first magnet assembly;
   the electromagnet assembly moving forward, to engage an aft side of the first magnet assembly, against the biasing of a return biasing member of the electronic actuator; and
   elongated block legs of the first magnet assembly and core stub legs of the electromagnet assembly engaging each other from movement of the electromagnet assembly; and retracting, by biasing from the return biasing member, the first magnet assembly and the electromagnet assembly, which are magnetically stuck together, wherein:

a coil winding of the electromagnet assembly defines a coil winding thickness in the forward-aft direction and the core stub legs define a stub leg length in the forward-aft direction, wherein the stub leg length is less than 50% of the coil winding thickness.

6. The method of claim 5, wherein:

wherein the stub leg length is less than 15% of the coil winding thickness.

7. The method of claim 5, wherein:

the elongated block legs and the core stub legs are configured so that when the first magnet assembly is retracted, the first magnet and the coil winding are spaced apart from each other in the forward-aft direction by a first clearance gap distance to define a first clearance gap therebetween.

8. The method of claim 5, wherein the electronic actuator includes a system housing that defines a hoistway rail engagement aperture, wherein:

the electromagnet assembly is disposed within the system housing, spaced apart from the hoistway rail engagement aperture;

the first magnet assembly is disposed in the system housing between the electromagnet assembly and the hoistway rail engagement aperture; and the return biasing member is disposed between the system housing and the electromagnet assembly, and the method includes:

retracting the first magnet assembly and the electromagnet assembly, which are magnetically stuck together, into the system housing by biasing from the return biasing member.

* * * * *